US011288860B2

(12) United States Patent
Abe et al.

(10) Patent No.: US 11,288,860 B2
(45) Date of Patent: Mar. 29, 2022

(54) INFORMATION PROCESSING APPARATUS, INFORMATION PROCESSING METHOD, PROGRAM, AND MOVABLE OBJECT

(71) Applicant: Sony Corporation, Tokyo (JP)

(72) Inventors: Shinichiro Abe, Kanagawa (JP); Masahiko Toyoshi, Tokyo (JP); Shun Lee, Saitama (JP); Keitaro Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/640,970

(22) PCT Filed: Aug. 23, 2018

(86) PCT No.: PCT/JP2018/031155
§ 371 (c)(1),
(2) Date: Feb. 21, 2020

(87) PCT Pub. No.: WO2019/044652
PCT Pub. Date: Mar. 7, 2019

(65) Prior Publication Data
US 2020/0175754 A1 Jun. 4, 2020

(30) Foreign Application Priority Data

Aug. 29, 2017 (JP) .............................. JP2017-164532

(51) Int. Cl.
*G06T 7/73* (2017.01)
*G06T 17/05* (2011.01)
(Continued)

(52) U.S. Cl.
CPC .............. *G06T 17/05* (2013.01); *G01C 21/30* (2013.01); *G05D 1/0246* (2013.01); *G06T 7/74* (2017.01); *G06T 2207/30252* (2013.01)

(58) Field of Classification Search
CPC .. G06T 7/30; G06T 7/33; G06T 7/337; G06T 7/344; G06T 7/70; G06T 7/73;
(Continued)

(56) References Cited

U.S. PATENT DOCUMENTS 9,367,065 B2   6/2016  Dolgov et al.
2005/0172526 A1*  8/2005  Taylor et al. .......... G01B 11/22
                                                37/466
(Continued)

FOREIGN PATENT DOCUMENTS

EP   1 975 565 A2   10/2008
GB   2 495 807 A    4/2013
(Continued)

OTHER PUBLICATIONS

International Search Report and Written Opinion dated Nov. 30, 2018 in connection with International Application No. PCT/JP2018/031155.
(Continued)

*Primary Examiner* — Andrew W Johns
(74) *Attorney, Agent, or Firm* — Wolf, Greenfield & Sacks, P.C.

(57) ABSTRACT

There is provided methods and apparatus for estimating a position of a movable object. A dynamic reference image is generated based on an environment and a reference image extracted from a map. A position of the movable object is estimated based on the dynamic reference image and an observation image of an area around the movable object.

21 Claims, 10 Drawing Sheets

(51) Int. Cl.
*G01C 21/30* (2006.01)
*G05D 1/02* (2020.01)

(58) Field of Classification Search
CPC ... G06T 7/74; G06T 7/75; G06T 2207/30244; G06T 2207/30252; G06K 9/00791; G06K 7/00798; G01C 21/005; G01C 21/30; G05D 1/0231; G05D 1/0246; G05D 1/0251

See application file for complete search history.

(56) References Cited

U.S. PATENT DOCUMENTS

| | | | |
|---|---|---|---|
| 2009/0245657 A1 | 10/2009 | Osugi | |
| 2013/0250068 A1* | 9/2013 | Aoki | G06T 7/85 348/47 |
| 2013/0336534 A1* | 12/2013 | Bobbitt et al. | G06K 9/00536 382/103 |
| 2014/0121964 A1* | 5/2014 | Stanley et al. | G01C 21/30 701/514 |
| 2014/0214255 A1 | 7/2014 | Dolgov et al. | |
| 2017/0008521 A1* | 1/2017 | Braunstein et al. | G08G 1/167 |
| 2017/0359561 A1* | 12/2017 | Vallespi-Gonzalez | H04N 13/239 |
| 2018/0202814 A1* | 7/2018 | Kudrynski et al. | G01C 21/28 |
| 2021/0061304 A1* | 3/2021 | Braunstein et al. | G01C 21/32 |

FOREIGN PATENT DOCUMENTS

| | | |
|---|---|---|
| JP | 2001283224 A | 10/2001 |
| JP | 2005326168 A | 11/2005 |
| JP | 2008250687 A | 10/2008 |
| JP | 2010225126 A | 10/2010 |
| JP | 2010237810 A | 10/2010 |
| JP | 2011215057 A | 10/2011 |
| JP | 2016015019 A | 1/2016 |
| JP | 2016-520882 A | 7/2016 |
| WO | WO-2014007175 A1 | 1/2014 |

OTHER PUBLICATIONS

International Preliminary Report on Patentability dated Mar. 12, 2020 in connection with International Application No. PCT/JP2018/031155.

* cited by examiner

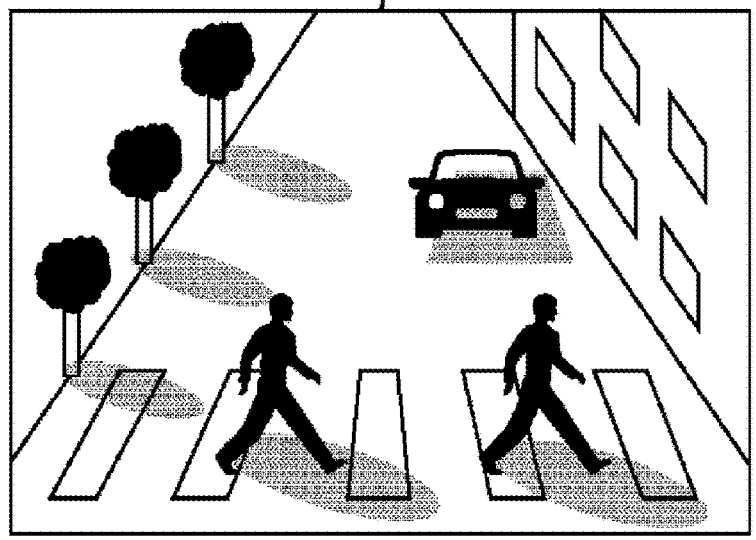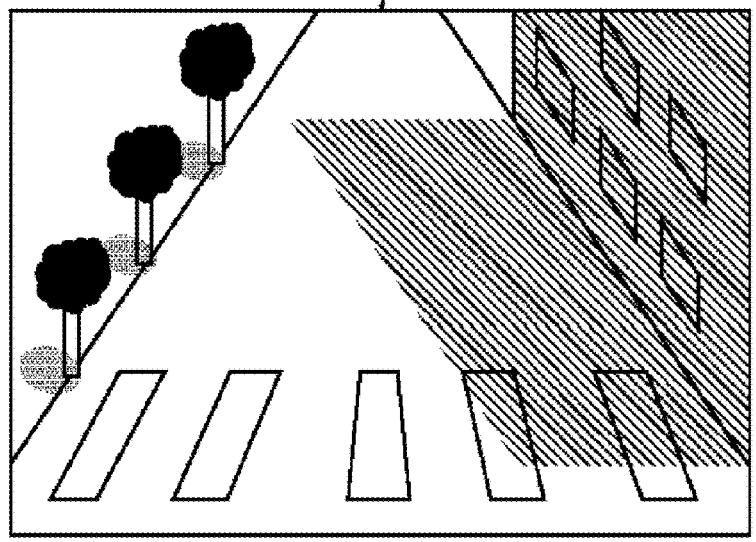
FIG.9

INFORMATION PROCESSING APPARATUS, INFORMATION PROCESSING METHOD, PROGRAM, AND MOVABLE OBJECT

CROSS REFERENCE TO RELATED APPLICATIONS

This application claims the benefit under 35 U.S.C. § 371 as a U.S. National Stage Entry of International Application No. PCT/JP2018/031155, filed in the Japanese Patent Office as a Receiving Office on Aug. 23, 2018, which claims priority to Japanese Patent Application Number JP2017-164532, filed in the Japanese Patent Office on Aug. 29, 2017, each of which is hereby incorporated by reference in its entirety.

This application claims the benefit of Japanese Priority Patent Application JP 2017-164532 filed Aug. 29, 2017, the entire contents of which are incorporated herein by reference.

TECHNICAL FIELD

The present technology relates to an information processing apparatus, an information processing method, a program, and a movable object, and particularly to an information processing apparatus, an information processing method, a program, and a movable object suitable for use when performing matching between an image of map data and an observation image.

BACKGROUND ART

In the past, a technology for estimating a self-position of a vehicle by creating map data including a plurality of registration images, which are captured at different positions and postures in advance, and performing matching between the registration image included in the map data and an observation image captured from the vehicle has been developed.

Further, in the past, it has been proposed to create a 3D model representing how each sensor of the vehicle sees the circumference of the vehicle, and combine the 3D model with detailed map information. Further, it has been proposed to adjust the shape or another property of the 3D model on the basis of weather information (see, for example, Patent Literature 1).

CITATION LIST

Patent Literature

PTL 1: Japanese Unexamined Patent Application Publication No. 2016-520882

SUMMARY OF INVENTION

Technical Problem

However, in the case of performing matching between the registration image and the observation image, a significantly different environment (e.g., weather, time of day, and presence/absence of a movable body such as a vehicle) at the time of capturing both the images reduces the matching accuracy. As a result, the accuracy of estimating the self-position of the vehicle is reduced. In Patent Literature 1, there is no particular study on suppressing the reduction in the matching accuracy.

The present technology has been made in view of the above circumstances to improve the matching accuracy between an image of map data and an observation image.

Solution to Problem

According to the present disclosure, there is provided a computerized method for estimating a position of a movable object. The method comprises generating a dynamic reference image based on an environment and a reference image extracted from a map, and estimating a position of the movable object based on the dynamic reference image and an observation image of an area around the movable object.

According to the present disclosure, there is provided an apparatus for estimating a position of a movable object. The apparatus comprises a processor in communication with a memory. The processor being configured to execute instructions stored in the memory that cause the processor to generate a dynamic reference image based on an estimated environment and a reference image extracted from a map, and estimate a position of the movable object based on the dynamic reference image and an observation image of an area around the movable object.

According to the present disclosure, there is provided a non-transitory computer-readable storage medium comprising computer-executable instructions that, when executed by a processor, perform a method for estimating a position of a movable object. The method comprises generating a dynamic reference image based on an estimated environment and a reference image extracted from a map, and estimating a position of the movable object based on the dynamic reference image and an observation image of an area around the movable object.

According to the present disclosure, there is provided a movable object configured to estimate a position of the movable object. The movable object comprises one or more processors in communication with a memory. The one or more processors are configured to execute instructions stored in the memory that cause the one or more processors to generate a dynamic reference image based on an estimated environment and a reference image extracted from a map, estimate a position of the movable object based on the dynamic reference image and an observation image of an area around the movable object; and generate a control signal to control movement of the movable object based on the estimated position.

Advantageous Effects of Invention

According to the first to third embodiment of the present technology, the matching accuracy between an image of map data and an observation image is improved.

It should be noted that the effect described here is not necessarily limitative and may be any effect described in the present disclosure.

BRIEF DESCRIPTION OF DRAWINGS

FIG. 9 is a schematic diagram showing an example of the key frame and an example of an observation image.

DESCRIPTION OF EMBODIMENTS

Hereinafter, embodiments for carrying out the present technology will be described. Descriptions will be made in the following order.

1. Configuration Example of Vehicle Control System
2. Embodiments
3. Modified Examples
4. Others

1. Configuration Example of Vehicle Control System

Figure 1:
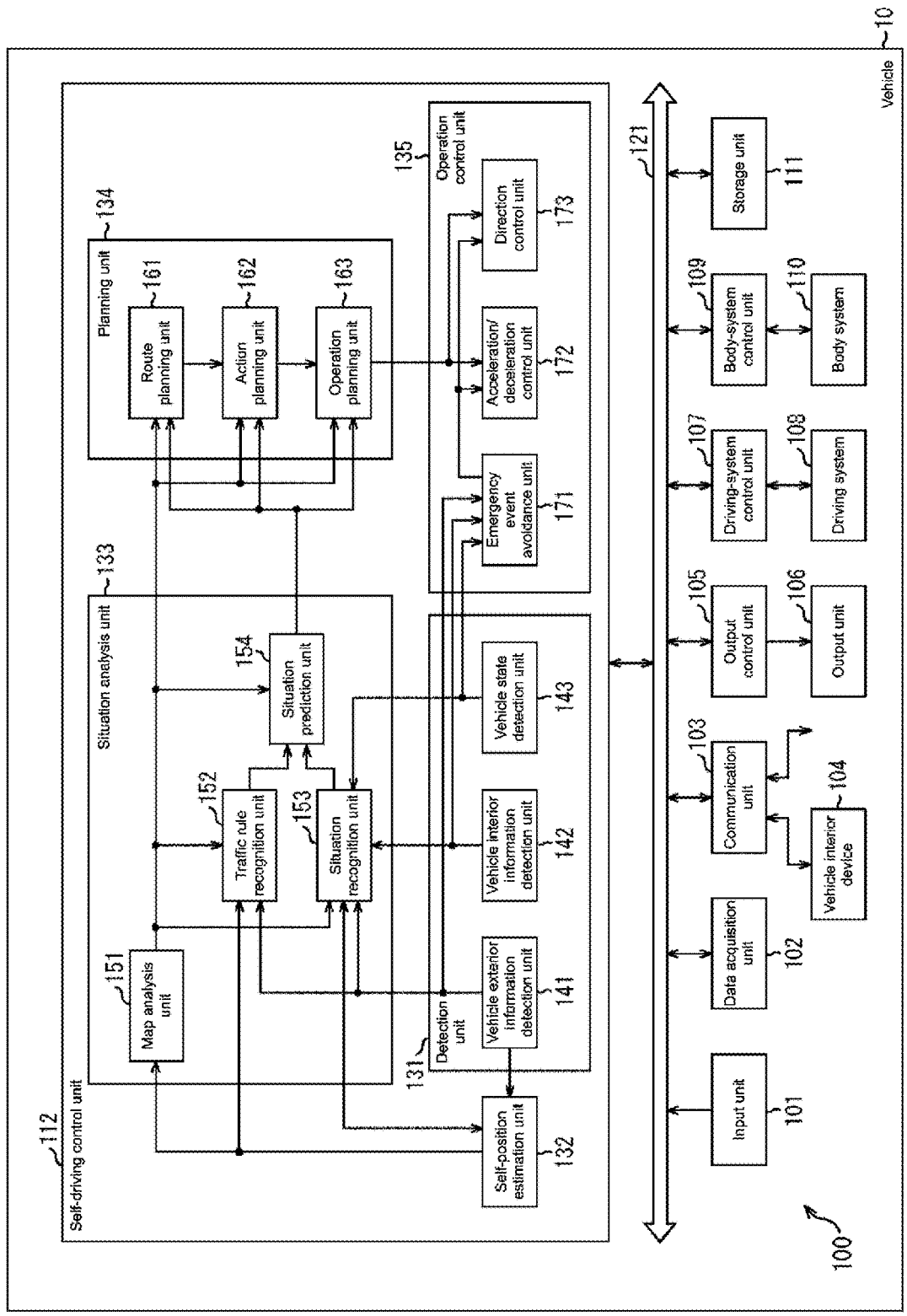
FIG. 1 is a block diagram showing a schematic functional configuration example of a vehicle control system to which the present technology can be applied.

FIG. 1 is a block diagram showing a schematic functional configuration example of a vehicle control system 100 as an example of a movable object control system to which the present technology can be applied.

The vehicle control system 100 is a system that is installed in a vehicle 10 and performs various types of control on the vehicle 10. Note that when distinguishing the vehicle 10 with another vehicle, it is referred to as the own car or own vehicle.

The vehicle control system 100 includes an input unit 101, a data acquisition unit 102, a communication unit 103, a vehicle interior device 104, an output control unit 105, an output unit 106, a driving-system control unit 107, a driving system 108, a body-system control unit 109, a body system 110, a storage unit 111, and an self-driving control unit 112. The input unit 101, the data acquisition unit 102, the communication unit 103, the output control unit 105, the driving-system control unit 107, the body-system control unit 109, the storage unit 111, and the self-driving control unit 112 are connected to each other via a communication network 121. The communication network 121 includes an on-vehicle communication network or a bus conforming to an arbitrary standard such as CAN (Controller Area Network), LIN (Local Interconnect Network), LAN (Local Area Network), and FlexRay (registered trademark). Note that the respective units of the vehicle control system 100 are directly connected to each other not via the communication network 121 in some cases.

Note that in the case where the respective units of the vehicle control system 100 perform communication via the communication network 121, description of the communication network 121 will be omitted below. For example, a case where the input unit 101 and the self-driving control unit 112 perform communication via the communication network 121 will be described simply as "the input unit 101 and the self-driving control unit 112 perform communication with each other".

The input unit 101 includes a device for a passenger to input various kinds of data, instructions, and the like. For example, the input unit 101 includes an operation device such as a touch panel, a button, a microphone, a switch, and a lever, and an operation device that can be operated by a method other than the manual operation, such as voice and gesture. Further, for example, the input unit 101 may be a remote control apparatus using infrared rays or other radio waves, or external connection device such as a mobile device and a wearable device, which supports the operation of the vehicle control system 100. The input unit 101 generates an input signal on the basis of the data or instruction input by the passenger, and supplies the input signal to the respective units of the vehicle control system 100.

The data acquisition unit 102 includes various sensors for acquiring data to be used for processing performed in the vehicle control system 100, or the like, and supplies the acquired data to the respective units of the vehicle control system 100.

For example, the data acquisition unit 102 includes various sensors for detecting the state and the like of the vehicle 10. Specifically, for example, the data acquisition unit 102 includes a gyro sensor, an acceleration sensor, an inertial measurement unit (IMU), and sensors for detecting the operational amount of an accelerator pedal, the operational amount of a brake pedal, the steering angle of a steering wheel, the engine r.p.m., the motor r.p.m., or the wheel rotation speed.

Further, for example, the data acquisition unit 102 includes various sensors for detecting information outside the vehicle 10. Specifically, for example, the data acquisition unit 102 includes an imaging apparatus such as a ToF (Time Of Flight) camera, a stereo camera, a monocular camera, an infrared camera, and other cameras. Further, for example, the data acquisition unit 102 includes an environment sensor for detecting weather, a meteorological phenomenon, or the like, and an ambient information detection sensor for detecting an object in the vicinity of the vehicle 10. The environment sensor includes, for example, a raindrop sensor, a fog sensor, a sunshine sensor, a snow sensor, or the like. The ambient information detection sensor includes, for example, an ultrasonic sensor, a radar, a LiDAR (Light Detection and Ranging, Laser Imaging Detection and Ranging), a sonar, or the like.

Further, for example, the data acquisition unit 102 includes various sensors for detecting the current position of the vehicle 10. Specifically, for example, the data acquisition unit 102 includes a GNSS receiver that receives a GNSS signal from a GNSS (Global Navigation Satellite System) satellite, or the like.

Further, for example, the data acquisition unit 102 includes various sensors for detecting vehicle interior information. Specifically, for example, the data acquisition unit 102 includes an imaging apparatus that captures an image of a driver, a biological sensor for detecting biological information regarding the driver, a microphone for collecting sound in the interior of the vehicle, and the like. The biological sensor is provided, for example, on a seating surface, a steering wheel, or the like, and detects biological information regarding the passenger sitting on a seat or the driver holding the steering wheel.

The communication unit 103 communicates with the vehicle interior device 104, and various devices, a server, and a base station outside the vehicle, and the like to transmit data supplied from the respective units of the vehicle control system 100 or supply the received data to the respective units of the vehicle control system 100. Note that the communication protocol supported by the communication unit 103 is not particularly limited, and the communication unit 103 may support a plurality of types of communication protocols.

For example, the communication unit 103 performs wireless communication with the vehicle interior device 104 via a wireless LAN, Bluetooth (registered trademark), NFC (Near Field Communication), WUSB (Wireless USB), or the like. Further, for example, the communication unit 103 performs wired communication with the vehicle interior device 104 by USB (Universal Serial Bus), HDMI (High-Definition Multimedia Interface), MHL (Mobile High-definition Link), or the like via a connection terminal (not shown) (and, if necessary, a cable).

Further, for example, the communication unit 103 communicates with a device (e.g., an application server or a control server) on an external network (e.g., the Internet, a cloud network, or a network unique to the operator) via a base station or an access point. Further, for example, the communication unit 103 communicates with a terminal (e.g., a terminal of a pedestrian or a shop, and an MTC (Machine Type Communication) terminal) in the vicinity of the vehicle 10 by using P2P (Peer To Peer) technology. Further, for example, the communication unit 103 performs V2X communication such as vehicle-to-vehicle communication, vehicle-to-infrastructure communication, communication between the vehicle 10 and a house, and vehicle-to-pedestrian communication. Further, for example, the communication unit 103 includes a beacon reception unit, receives via radio wave or electromagnetic waves transmitted from a radio station or the like placed on a road, and acquires information such as information of the current position, traffic congestion, traffic regulation, or necessary time.

The vehicle interior device 104 includes, for example, a mobile device or a wearable device owned by the passenger, an information device carried in or attached to the vehicle 10, a navigation apparatus that searches for a path to an arbitrary destination.

The output control unit 105 controls output of various types of information regarding the passenger of the vehicle 10 or information outside the vehicle 10. For example, the output control unit 105 generates an output signal containing at least one of visual information (e.g., image data) and auditory information (e.g., audio data), supplies the signal to the output unit 106, and thereby controls output of the visual information and the auditory information from the output unit 106. Specifically, for example, the output control unit 105 combines data of images captured by different imaging apparatuses of the data acquisition unit 102 to generate an overhead image, a panoramic image, or the like, and supplies an output signal containing the generated image to the output unit 106. Further, for example, the output control unit 105 generates audio data containing warning sound, a warning message, or the like for danger such as collision, contact, and entry into a dangerous zone, and supplies an output signal containing the generated audio data to the output unit 106.

The output unit 106 includes an apparatus capable of outputting visual information or auditory information to the passenger of the vehicle 10 or the outside of the vehicle 10. For example, the output unit 106 includes a display apparatus, an instrument panel, an audio speaker, a headphone, a wearable device such as a spectacle-type display to be attached to the passenger, a projector, a lamp, and the like. The display apparatus included in the output unit 106 is not limited to the apparatus including a normal display, and may be, for example, an apparatus for displaying visual information within the field of view of the driver, such as a head-up display, a transmissive display, and an apparatus having an AR (Augmented Reality) display function.

The driving-system control unit 107 generates various control signals, supplies the signals to the driving system 108, and thereby controls the driving system 108. Further, the driving-system control unit 107 supplies the control signal to the respective units other than the driving system 108 as necessary, and notifies the control state of the driving system 108, and the like.

The driving system 108 includes various apparatuses related to the driving system of the vehicle 10. For example, the driving system 108 includes a driving force generation apparatus for generating a driving force, such as an internal combustion engine and a driving motor, a driving force transmission mechanism for transmitting the driving force to wheels, a steering mechanism for adjusting the steering angle, a braking apparatus for generating a braking force, an ABS (Antilock Brake System), an ESC (Electronic Stability Control), an electric power steering apparatus, for example.

The body-system control unit 109 generates various control signals, supplies the signals to the body system 110, and thereby controls the body system 110. Further, the body-system control unit 109 supplies the control signals to the respective units other than the body system 110 as necessary, and notifies the control state of the body system 110, for example.

The body system 110 includes various body-system apparatuses equipped on the vehicle body. For example, the body system 110 includes a keyless entry system, a smart key system, a power window apparatus, a power seat, a steering wheel, an air conditioner, various lamps (e.g., a head lamp, a back lamp, a brake lamp, a blinker, and a fog lamp), and the like.

The storage unit 111 includes, for example, a magnetic storage device such as a ROM (Read Only Memory), a RAM (Random Access Memory), and an HDD (Hard Disc Drive), a semiconductor storage device, an optical storage device, and a magneto-optical storage device, or the like. The storage unit 111 stores various programs, data, and the like to be used by the respective units of the vehicle control system 100. For example, the storage unit 111 stores map data of a three-dimensional high precision map such as a dynamic map, a global map that has a lower precision and covers a wider area than the high precision map, and a local map containing information regarding the surroundings of the vehicle 10.

The self-driving control unit 112 performs control on self-driving such as autonomous driving and driving assistance. Specifically, for example, the self-driving control unit 112 is capable of performing coordinated control for the purpose of realizing the ADAS (Advanced Driver Assistance System) function including avoiding collision of the vehicle 10, lowering impacts of the vehicle collision, follow-up driving based on a distance between vehicles, constant speed driving, a collision warning for the vehicle 10, a lane departure warning for the vehicle 10, or the like. Further, for example, the self-driving control unit 112 performs coordinated control for the purpose of realizing self-driving, i.e., autonomous driving without the need of drivers' operations, and the like. The self-driving control unit 112 includes a detection unit 131, a self-position estimation unit 132, a situation analysis unit 133, a planning unit 134, and an operation control unit 135.

The detection unit 131 detects various types of information necessary for control of self-driving. The detection unit 131 includes a vehicle exterior information detection unit 141, a vehicle interior information detection unit 142, and a vehicle state detection unit 143.

The vehicle exterior information detection unit 141 performs processing of detecting information outside the vehicle 10 on the basis of the data or signal from the respective units of the vehicle control system 100. For example, the vehicle exterior information detection unit 141 performs processing of detecting, recognizing, and following-up an object in the vicinity of the vehicle 10, and processing of detecting the distance to the object. The object to be detected includes, for example, a vehicle, a human, an obstacle, a structure, a road, a traffic signal, a traffic sign, and a road sign. Further, for example, the vehicle exterior information detection unit 141 performs processing of detecting the ambient environment of the vehicle 10. The ambient environment to be detected includes, for example, weather, temperature, humidity, brightness, condition of a road surface, and the like. The vehicle exterior information detection unit 141 supplies the data indicating the results of the detection processing to the self-position estimation unit 132, a map analysis unit 151, a traffic rule recognition unit 152, and a situation recognition unit 153 of the situation analysis unit 133, and an emergency event avoidance unit 171 of the operation control unit 135, for example.

The vehicle interior information detection unit 142 performs processing of detecting vehicle interior information on the basis of the data or signal from the respective units of the vehicle control system 100. For example, the vehicle interior information detection unit 142 performs processing of authenticating and recognizing the driver, processing of detecting the state of the driver, processing of detecting the passenger, and processing of detecting the environment inside the vehicle. The state of the driver to be detected includes, for example, physical condition, arousal degree, concentration degree, fatigue degree, line-of-sight direction, and the like. The environment inside the vehicle to be detected includes, for example, temperature, humidity, brightness, smell, and the like. The vehicle interior information detection unit 142 supplies the data indicating the results of the detection processing to the situation recognition unit 153 of the situation analysis unit 133, and the emergency event avoidance unit 171 of the operation control unit 135, for example.

The vehicle state detection unit 143 performs processing of detecting the state of the vehicle 10 on the basis of the data or signal from the respective units of the vehicle control system 100. The state of the vehicle 10 to be detected includes, for example, speed, acceleration, steering angle, presence/absence and content of abnormality, the state of the driving operation, position and inclination of the power seat, the state of the door lock, the state of other on-vehicle devices, and the like. The vehicle state detection unit 143 supplies the data indicating the results of the detection processing to the situation recognition unit 153 of the situation analysis unit 133, and the emergency event avoidance unit 171 of the operation control unit 135, for example.

The self-position estimation unit 132 performs processing of estimating a position, a posture, and the like of the vehicle 10 on the basis of the data or signal from the respective units of the vehicle control system 100, such as the vehicle exterior information detection unit 141 and the situation recognition unit 153 of the situation analysis unit 133. Further, the self-position estimation unit 132 generates a local map (hereinafter, referred to as the self-position estimation map) to be used for estimating a self-position as necessary. The self-position estimation map is, for example, a high precision map using a technology such as SLAM (Simultaneous Localization and Mapping). The self-position estimation unit 132 supplies the data indicating the results of the estimation processing to the map analysis unit 151, the traffic rule recognition unit 152, and the situation recognition unit 153 of the situation analysis unit 133, for example. Further, the self-position estimation unit 132 causes the storage unit 111 to store the self-position estimation map.

The situation analysis unit 133 performs processing of analyzing the situation of the vehicle 10 and the surroundings thereof. The situation analysis unit 133 includes the map analysis unit 151, the traffic rule recognition unit 152, the situation recognition unit 153, and a situation prediction unit 154.

The map analysis unit 151 performs processing of analyzing various maps stored in the storage unit 111 while using the data or signal from the respective units of the vehicle control system 100, such as the self-position estimation unit 132 and the vehicle exterior information detection unit 141, as necessary, and thereby builds a map containing information necessary for self-driving processing. The map analysis unit 151 supplies the built map to the traffic rule recognition unit 152, the situation recognition unit 153, the situation prediction unit 154, and a route planning unit 161, an action planning unit 162, and an operation planning unit 163 of the planning unit 134, for example.

The traffic rule recognition unit 152 performs processing of recognizing a traffic rule in the vicinity of the vehicle 10 on the basis of the data or signal from the respective units of the vehicle control system 100, such as the self-position estimation unit 132, the vehicle exterior information detection unit 141, and the map analysis unit 151. By this recognition processing, for example, the position and state of the traffic signal in the vicinity of the vehicle 10, content of the traffic regulation in the vicinity of the vehicle 10, a drivable lane, and the like are recognized. The traffic rule recognition unit 152 supplies the data indicating the results of the recognition processing to the situation prediction unit 154 and the like.

The situation recognition unit 153 performs processing of recognizing the situation regarding the vehicle 10 on the basis of the data or signal from the respective units of the vehicle control system 100, such as the self-position estimation unit 132, the vehicle exterior information detection unit 141, the vehicle interior information detection unit 142, the vehicle state detection unit 143, and the map analysis unit 151. For example, the situation recognition unit 153 performs processing of recognizing the situation of the vehicle 10, the situation of the surroundings of the vehicle 10, the state of the driver of the vehicle 10, and the like. Further, the situation recognition unit 153 generates a local map (hereinafter, referred to as the situation recognition map) to be used for recognizing the situation of the surroundings of the vehicle 10, as necessary. The situation recognition map is, for example, an occupancy grid map.

The situation of the vehicle 10 to be recognized includes, for example, the position, posture, and movement (e.g., speed, acceleration, and moving direction) of the vehicle 10, presence/absence of and content of abnormality, and the like. The situation of the surroundings of the vehicle 10 to be recognized includes, for example, the type and position of a stationary object of the surroundings, the type, position, and movement (e.g., speed, acceleration, and moving direction) of a movable body of the surroundings, the configuration a road of the surroundings, the condition of a road surface, weather, temperature, humidity, and brightness of the surroundings, and the like. The state of the driver to be recognized includes, for example, physical condition, arousal degree, concentration degree, fatigue degree, movement of the line of sight, driving operation, and the like.

The situation recognition unit 153 supplies the data (including the situation recognition map as necessary) indicating the results of the recognition processing to the self-position estimation unit 132 and the situation prediction unit 154, for example. Further, the situation recognition unit 153 causes the storage unit 111 to store the situation recognition map.

The situation prediction unit 154 performs processing of predicting the situation regarding the vehicle 10 on the basis of the data or signal from the respective units of the vehicle control system 100, such as the map analysis unit 151, the traffic rule recognition unit 152 and the situation recognition unit 153. For example, the situation prediction unit 154 performs processing of predicting the situation of the vehicle 10, the situation of the surroundings of the vehicle 10, the state of the driver, and the like.

The situation of the vehicle 10 to be predicted includes, for example, the behavior of the vehicle 10, occurrence of abnormality, a drivable distance, and the like. The situation of the surroundings of the vehicle 10 to be predicted includes, for example, the behavior of a movable body in the vicinity of the vehicle 10, change of the state of a traffic signal, change of the environment such as weather, and the like. The state of the driver to be predicted includes, for example, the behavior, physical condition, and the like of the driver.

The situation prediction unit 154 supplies the data indicating the results of the prediction processing to, for example, the route planning unit 161, the action planning unit 162, and the operation planning unit 163 of the planning unit 134, together with the data from the traffic rule recognition unit 152 and the situation recognition unit 153.

The route planning unit 161 plans a route to a destination on the basis of the data or signal from the respective units of the vehicle control system 100, such as the map analysis unit 151 and the situation prediction unit 154. For example, the route planning unit 161 sets a route from the current position to the specified destination on the basis of a global map. Further, for example, the route planning unit 161 changes the route as appropriate on the basis of traffic congestion, the accident, traffic regulation, conditions of construction or the like, the physical condition of the driver, and the like. The route planning unit 161 supplies the data indicating the planned route to the action planning unit 162, for example.

The action planning unit 162 plans an action of the vehicle 10 for safely driving on the route planned by the route planning unit 161 within the planned time period on the basis of the data or signal from the respective units of the vehicle control system 100, such as the map analysis unit 151 and the situation prediction unit 154. For example, the action planning unit 162 makes plans for starting, stopping, travelling directions (e.g., forward, backward, turning left, turning right, and changing direction), driving lane, driving speed, overtaking, and the like. The action planning unit 162 supplies the data indicating the planned action of the vehicle 10 to the operation planning unit 163, for example.

The operation planning unit 163 plans the operation of the vehicle 10 for realizing the action planned by the action planning unit 162 on the basis of the data or signal from the respective units of the vehicle control system 100, such as the map analysis unit 151 and the situation prediction unit 154. For example, the operation planning unit 163 makes plans for acceleration, deceleration, running track, and the like. The operation planning unit 163 supplies the data indicating the planned operation of the vehicle 10 to an acceleration/deceleration control unit 172 and a direction control unit 173 of the operation control unit 135, for example.

The operation control unit 135 controls the operation of the vehicle 10. The operation control unit 135 includes the emergency event avoidance unit 171, the acceleration/deceleration control unit 172, and the direction control unit 173.

The emergency event avoidance unit 171 performs processing of detecting an emergency event such as collision, contact, entry into a dangerous zone, abnormality of the driver, and abnormality of the vehicle 10 on the basis of the detection results by the vehicle exterior information detection unit 141, the vehicle interior information detection unit 142, and the vehicle state detection unit 143. In the case of detecting occurrence of an emergency event, the emergency event avoidance unit 171 plans the operation (such as sudden stop and sudden turn) of the vehicle 10 for avoiding the emergency event. The emergency event avoidance unit 171 supplies the data indicating the planned operation of the vehicle 10 to the acceleration/deceleration control unit 172 and the direction control unit 173, for example.

The acceleration/deceleration control unit 172 performs acceleration/deceleration control for realizing the operation of the vehicle 10 planned by the operation planning unit 163 or the emergency event avoidance unit 171. For example, the acceleration/deceleration control unit 172 calculates a control target value of a driving-force generation apparatus or a braking apparatus for realizing the planned acceleration, deceleration, or sudden stop, and supplies a control command indicating the calculated control target value to the driving-system control unit 107.

The direction control unit 173 controls the direction for realizing the operation of the vehicle 10 planned by the operation planning unit 163 or the emergency event avoidance unit 171. For example, the direction control unit 173 calculates a control target value of a steering mechanism for realizing the running track or sudden turn planned by the operation planning unit 163 or the emergency event avoidance unit 171, and supplies a control command indicating the calculated control target value to the driving-system control unit 107.

2. Embodiments

Next, embodiments of the present technology will be described with reference to FIG. 2 to FIG. 9.

Note that the present technology is a technology relating to processing of generating map data to be used for the processing performed by mainly the data acquisition unit 102 and the self-position estimation unit 132 of the vehicle control system 100 shown in FIG. 1, and for the self-position estimation processing.

Configuration Example of Map Generation System

Figure 2:
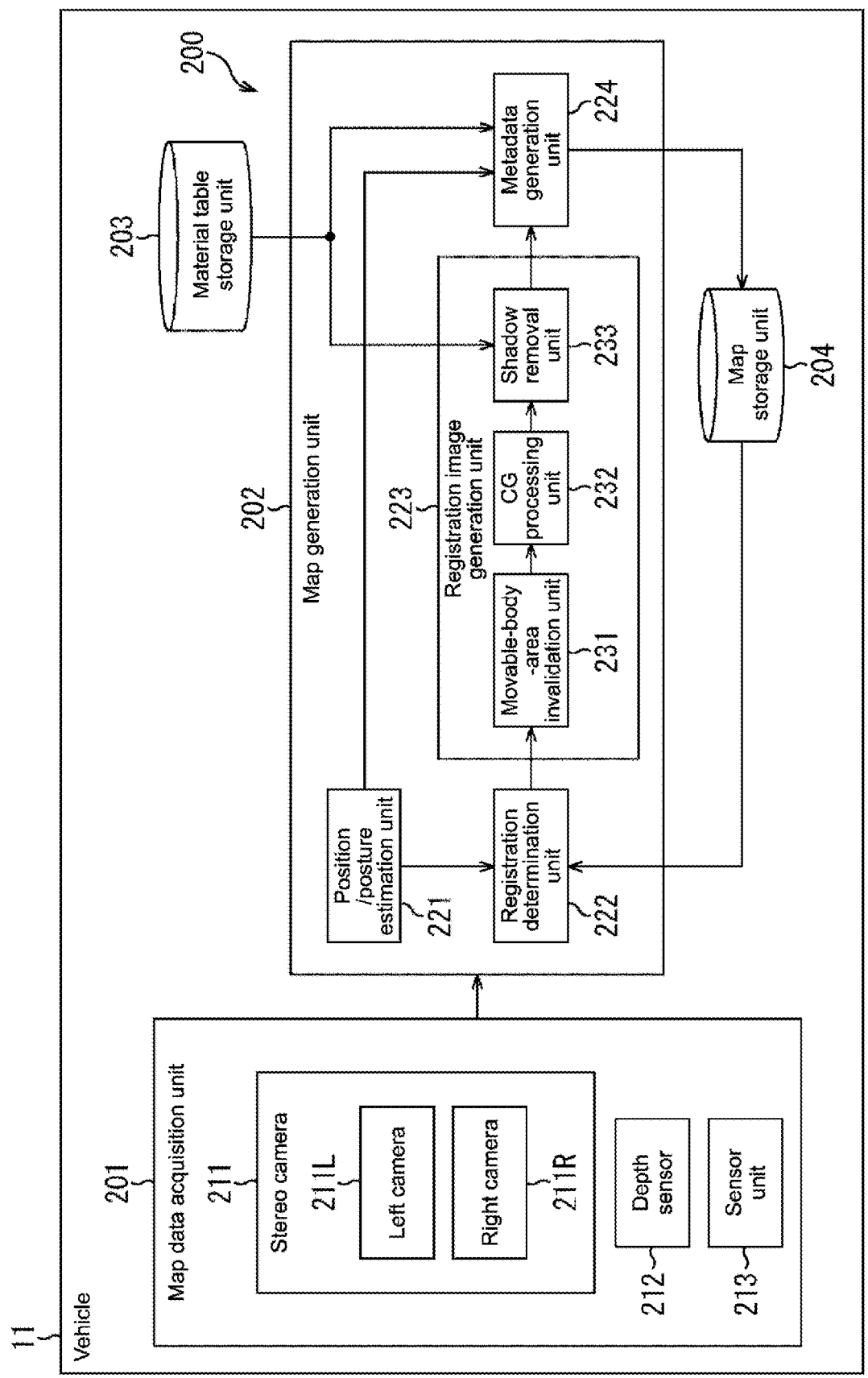
FIG. 2 is a block diagram showing one embodiment of a map generation system to which the present technology is applied.

FIG. 2 is a block diagram showing one embodiment of a map generation system to which the present technology is applied.

A map generation system 200 is installed in, for example, a vehicle 11 different from the vehicle 10 in which the vehicle control system 100 shown in FIG. 1 is installed. Then, the map generation system 200 generates a key frame map that is map data to be used for the self-position estimation processing in the vehicle control system 100.

The key frame map includes a plurality of registration images (hereinafter, referred to as the key frames) generated on the basis of a plurality of images (hereinafter, referred to as map images) captured from the vehicle 11 at different positions and postures, and metadata of each key frame.

The map generation system 200 includes a map data acquisition unit 201, a map generation unit 202, a material table storage unit 203, and a map storage unit 204.

The map data acquisition unit 201 acquires map data that is data to be used for generating a key frame map. The map data acquisition unit 201 includes a stereo camera 211, a depth sensor 212, and a sensor unit 213.

The stereo camera 211 includes a left camera 211L and a right camera 211R. The left camera 211L and the right camera 211R capture images (stereo photographing) of the front of the vehicle 11 from different, i.e., left and right directions, respectively, and supply the resulting captured images (map images) to the map generation unit 202.

Note that hereinafter, when individually distinguishing the map image captured by the left camera 211L and the map image captured by the right camera 211R with each other, the former is referred to as the left map image and the latter is referred to as the right map image.

The depth sensor 212 detects the distance (depth) to each object in front of the vehicle 11, and supplies depth information indicating the detection results to the map generation unit 202.

The sensor unit 213 includes, for example, various sensors for detecting data to be used for estimating the position and posture of the vehicle 11. For example, the sensor unit 213 includes, an IMU for detecting the acceleration, angular velocity, and the like of the vehicle 11, a GNSS receiver that receives a GNSS signal from a GNSS satellite and the like. The sensor unit 213 supplies, to the map generation unit 202, the sensor data output from each sensor.

The map generation unit 202 performs processing of generating a key frame to be registered in a key frame map, and metadata regarding each key frame, and registering them in the key frame map stored in the map storage unit 204. The map generation unit 202 includes a position/posture estimation unit 221, a registration determination unit 222, a registration image generation unit 223, and a metadata generation unit 224.

The position/posture estimation unit 221 estimates the position and posture of the vehicle 11 on the basis of the map data supplied from the map data acquisition unit 201. The position/posture estimation unit 221 supplies the estimation results to the registration determination unit 222 and the metadata generation unit 224.

The registration determination unit 222 determines registration of a key frame on the basis of the estimation results of the position and posture of the vehicle 11, the map image, and the key frame registered in the key frame map stored in the map storage unit 204. In the case of determining that a key frame is to be registered, the registration determination unit 222 supplies the map image to be used for generating a key frame and depth information to a movable-body-area invalidation unit 231 of the registration image generation unit 223.

The registration image generation unit 223 performs processing of generating a key frame that is a registration image of a key frame map. The registration image generation unit 223 includes the movable-body-area invalidation unit 231, a CG (Computer Graphics) processing unit 232, and a shadow removal unit 233.

The movable-body-area invalidation unit 231 performs processing of detecting a movable body area where there is a movable body in the map image on the basis of the depth information and the like, and invalidating the movable body area. The movable-body-area invalidation unit 231 supplies the map image in which the movable body area is invalidated and the depth information to the CG processing unit 232.

The CG processing unit 232 performs CG processing on the map image, and thereby generates polygon mesh. The CG processing unit 232 supplies the generated polygon mesh and the depth information to the shadow removal unit 233.

The shadow removal unit 233 removes the shadow of texture of the polygon mesh on the basis of the material table and the like stored in the material table storage unit 203. The shadow removal unit 233 supplies, as a key frame, the polygon mesh from which the shadow is removed to the metadata generation unit 224.

The metadata generation unit 224 generates metadata regarding the key frame. Then, the metadata generation unit 224 registers the key frame and the metadata in association with each other in the key frame map stored in the map storage unit 204.

The material table storage unit 203 stores the material table.

Here, the material table is a list of physical properties (material properties), characteristics, and the like of various materials. The material properties include, for example, information regarding whether or not the material is metal or non-metal, and information regarding a specular reflection coefficient, a diffuse reflection coefficient, and roughness coefficient.

The map storage unit 204 stores the key frame map.

Note that the material table storage unit 203 and the map storage unit 204 do not necessarily need to be provided in the vehicle 11, and may be provided in an external server or the like.

Map Generation Processing

Figure 3:
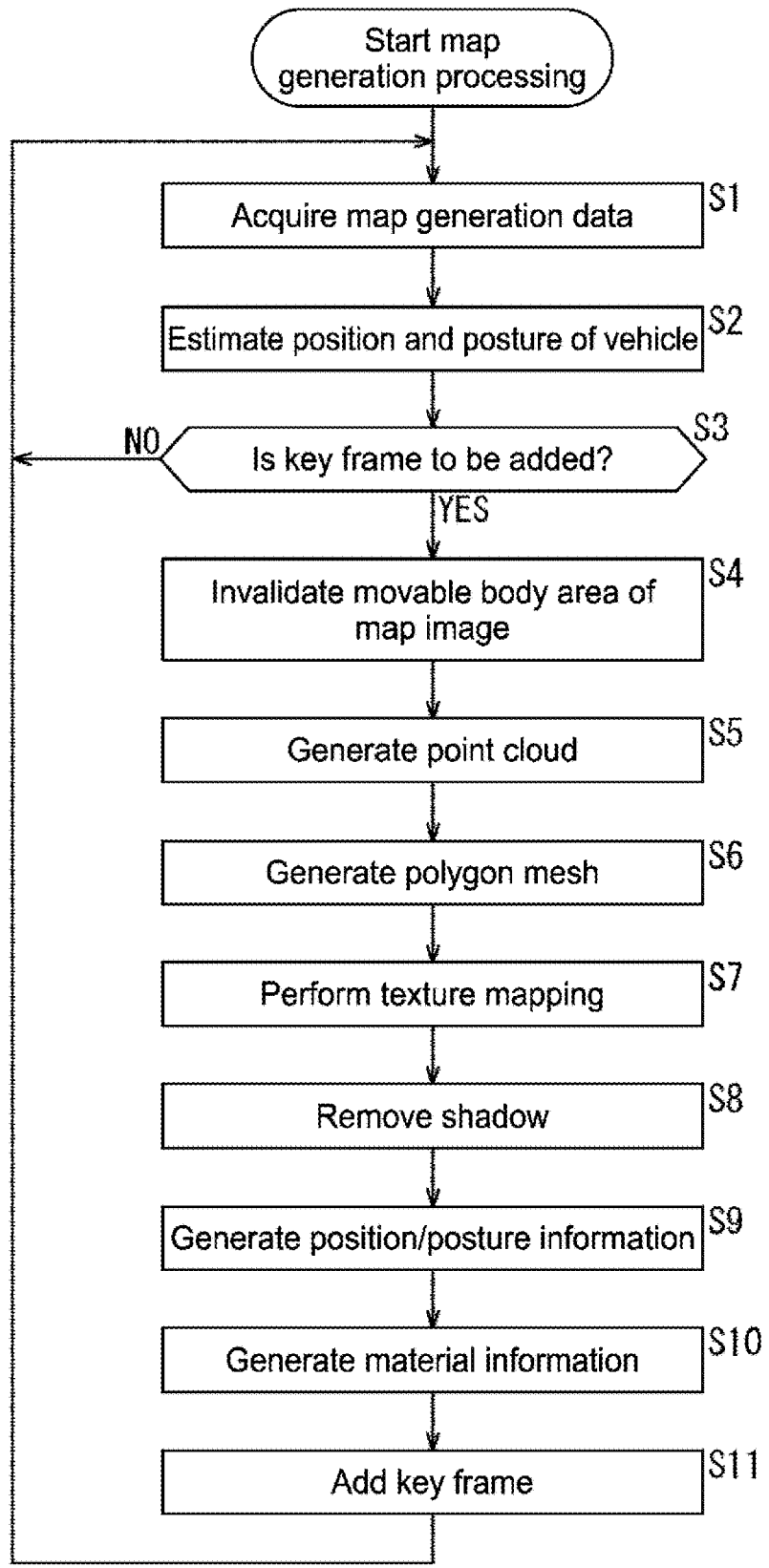
FIG. 3 is a flowchart describing map generation processing.

Next, with reference to the flowchart of FIG. 3, map generation processing executed by the map generation system 200 will be described. This processing is started when a command for starting map generation processing is input to a map generation system, and finished when a command for finishing the map generation processing is input to the map generation system.

In Step S1, the map data acquisition unit 201 acquires map generation data.

Specifically, the left camera 211L and the right camera 211R of the stereo camera 211 captures images of the front of the vehicle 11, and supply the obtained left map image and right map image to the map generation unit 202, respectively.

The depth sensor 212 detects the depth to each object in front of the vehicle 11, and supplies depth information indicating the detection results to the map generation unit 202.

Each sensor of the sensor unit 213 performs processing of detecting various types of data, and supplies sensor data indicating the detection results to the map generation unit 202.

In Step S2, the position/posture estimation unit 221 estimates the position and posture of the vehicle 11.

Note that as the method of estimating the position and posture of the vehicle 11, an arbitrary method can be adopted. For example, a high-performance estimation method using an RTK (Real Time Kinematic)-GNSS, a LiDAR, or the like is used. Note that in the case of using LiDAR, for example, a LiDAR is provided in the map data acquisition unit 201 shown in FIG. 2.

The position/posture estimation unit 221 supplies the estimation results of the position and posture of the vehicle 11 to the registration determination unit 222 and the metadata generation unit 224.

In Step S3, the registration determination unit 222 determines whether or not a key frame is to be added. For example, in the case where the amount of change of the position and posture of the vehicle 11 after a previous key frame is added previously is not less than a predetermined threshold value, the registration determination unit 222 determines that a key frame is to be added. Meanwhile, in the case where the amount of change of the position and posture of the vehicle 11 after a previous key frame is added previously is less than the predetermined threshold value, the registration determination unit 222 determines that a key frame is not to be added.

Note that at this time, the registration determination unit 222 may perform determination on the basis of whether or not a key frame similar to the latest map generation image is registered in the key frame map in addition to the amount of change of the position and posture of the vehicle 11.

For example, the registration determination unit 222 extracts, from key frames registered in the key frame map stored in the map storage unit 204, a key frame that position/posture information added as metadata is close to the current position and posture of the vehicle 11. Next, the registration determination unit 222 calculates the degree of similarity between the extracted key frame and the latest map image. Then, in the case where the degree of similarity is less than a predetermined threshold value, i.e., there is no key frame registration record in the vicinity of the current vehicle 11, the registration determination unit 222 determines that a key frame is to be added. Meanwhile, in the case where the degree of similarity is not less than the predetermined threshold value, i.e., there is a key frame registration record in the vicinity of the current vehicle 11, the registration determination unit 222 determines that a key frame is not to be added.

Then, in the case where it is determined that a key frame is not to be added in Step S3, the processing returns to Step S1. After that, the processing from Step S1 to Step S3 is repeatedly executed until it is determined that a key frame is to be added in Step S3.

Meanwhile, in the case where it is determined that a key frame is to be added in Step S3, the processing proceeds to Step S4. At this time, the registration determination unit 222 supplies the map image and the depth information to the movable-body-area invalidation unit 231.

In Step S4, the movable-body-area invalidation unit 231 invalidates the movable body area of the map image.

For example, the movable-body-area invalidation unit 231 performs semantic segmentation on each of the right and left map images by using the depth information and the like to detect a movable body area in which there is a movable body.

Here, the movable body to be detected includes, for example, a vehicle, a human, an animal, and the like. Further, the type of the movable body to be detected can be arbitrarily set. Further, for example, the type of the movable body to be detected may be set in advance, or may be dynamically set on the basis of information acquired from a server or the like.

Further, for the semantic segmentation, a model obtained by learning processing such as deep learning in advance is used, for example.

Then, the movable-body-area invalidation unit 231 invalidates a movable body area that is one dynamic element, which is changed as time passes, of the right and left map images.

Here, invalidating the movable body area of the map image represents that the movable body area is not to be processed in the following processing. As the method of invalidating the movable body area, an arbitrary method can be adopted.

For example, the movable-body-area invalidation unit 231 generates metadata regarding the position and the like of the movable body area, and associates the metadata with the right and left map images. Accordingly, in the subsequent processing, the movable body area is set as an area that is not to be processed, on the basis of the metadata.

Alternatively, the movable-body-area invalidation unit 231 removes a movable body area from the map image by, for example, filling the movable body area with predetermined color (e.g., black or white).

Note that after removing the movable body area, the movable-body-area invalidation unit 231 may interpolate an image of the background of the movable body in the removed area. In this case, for example, a map image 252 is generated from a map image 251 shown in FIG. 4. In the map image 252, a vehicle and humans are removed from the map image 251 and images of the background thereof are interpolated. Note that in FIG. 4, only one of the right and left map images is shown.

Note that as the method of interpolating the image of the background of a movable body, an arbitrary method can be adopted. For example, a map image captured at a similar position and posture at another time of day, or a key frame in a similar position and posture may be used for interpolating the image of the background. Alternatively, for example, a model generated by prior learning processing may be used for estimating an image of the background, and the estimated image may be interpolated.

Note that an example of the case where an image of the background of a movable body is interpolated will be mainly described below.

In Step S5, the CG processing unit 232 generates a point cloud. Specifically, the CG processing unit 232 converts each of the right and left map images in which the movable body area has been invalidated into a point cloud on the basis of the depth information.

Note that in the case where it is necessary to particularly distinguish the map images with each other, the point cloud corresponding to the left map image and the point cloud corresponding to the right map image will be respectively referred to as the left point cloud and the right point cloud hereinafter.

In Step S6, the CG processing unit 232 generates a polygon mesh by using the point cloud. Note that as the method of generating a polygon mesh, for example, a surface generation method such as marching cubes and a dual method can be used.

Note that in the case where it is necessary to particularly distinguish the point clouds with each other, the polygon mesh corresponding to the left point cloud and the polygon mesh corresponding to the right point cloud will be respectively referred to as the left polygon mesh and the right polygon mesh hereinafter.

In Step S7, the CG processing unit 232 performs texture mapping. Specifically, the CG processing unit 232 performs texture mapping on the right and left polygon meshes by using color information of the right map image and color information of the left map image, respectively. At this time, the CG processing unit 232 obtains, for example, offsets of the position and posture of the stereo camera 211 and the depth sensor 212 by calibration in advance, and maps the color information on each polygon of the polygon mesh on the basis of the offset. The CG processing unit 232 supplies the right and left polygon meshes in which texture mapping has been performed to the shadow removal unit 233.

In Step S8, the shadow removal unit 233 removes a shadow. Specifically, the shadow removal unit 233 removes a shadow of the texture mapped on the right and left polygon meshes. Accordingly, the shadow of the image, which is one dynamic element of the right and left map images, is invalidated.

Figure 4:
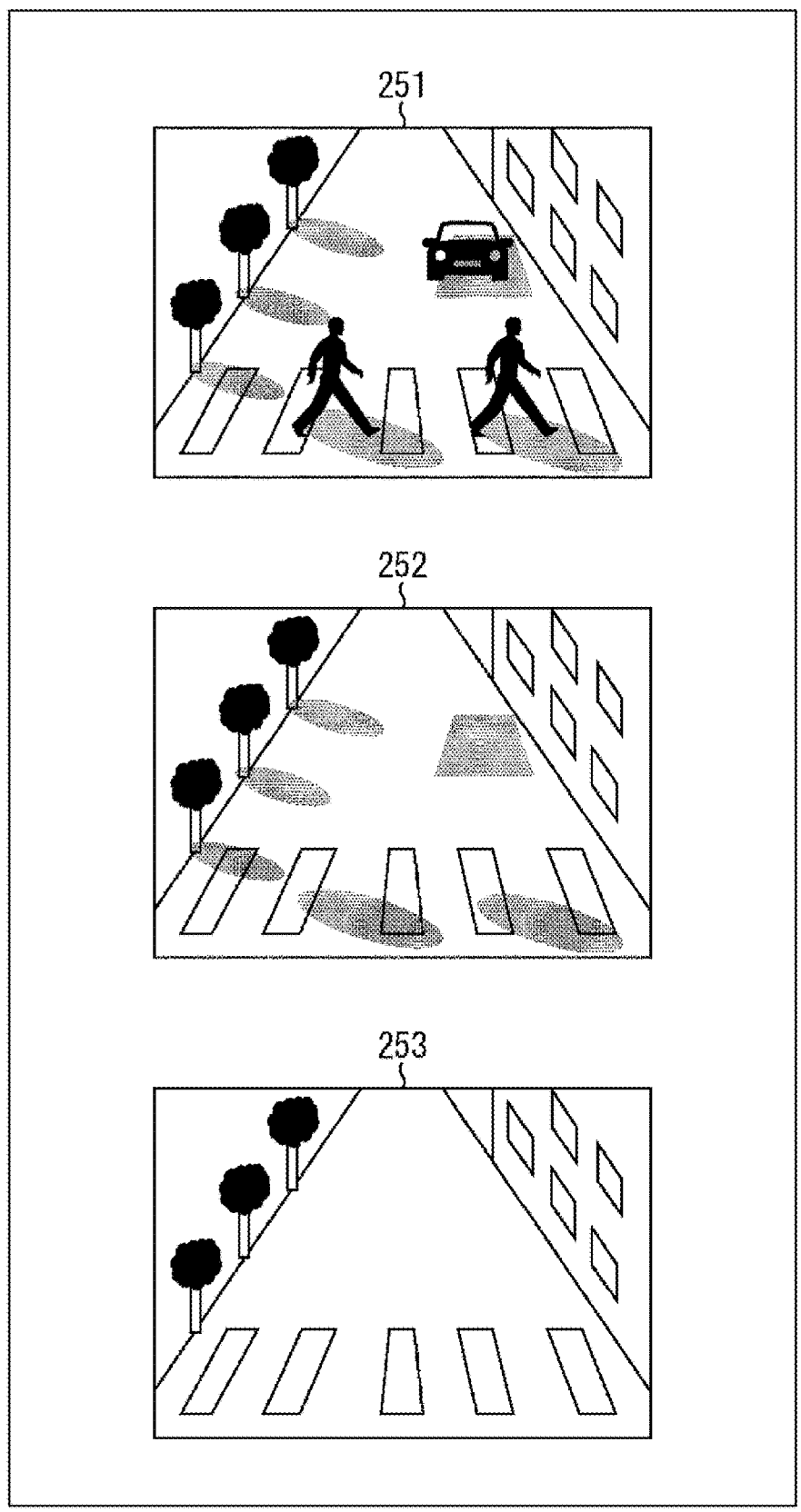
FIG. 4 is a diagram describing a method of generating a key frame.

By the processing of Step S5 to Step S8 described above, for example, a key frame 253 including a polygon mesh obtained by removing the shadow from the map image 252 shown in FIG. 4 is generated. Note that in this figure, the key frame 253 is shown by not a polygon mesh but a normal image in order to make the figure easy to understand.

Note that as the shadow removal of a polygon mesh, an arbitrary method can be adopted.

For example, the shadow removal unit 233 removes a shadow of a polygon mesh by using a model that has learned in advance by deep learning using a color image.

Alternatively, for example, the shadow removal unit 233 estimates the material properties of each polygon of a polygon mesh on the basis of the material table stored in the material table storage unit 203. Next, the shadow removal unit 233 estimates the position of a light source on the basis of the map image, the depth information, and the estimation results of the material properties. Then, the shadow removal unit 233 removes a shadow due to the influence of the light source from the texture of each polygon on the basis of the estimation results of the material properties of each polygon.

Alternatively, for example, a human may remove a shadow of a polygon mesh by using predetermined software.

The shadow removal unit 233 supplies, as the right and left key frames, the right and left polygon meshes from which the shadow has been removed to the metadata generation unit 224.

In Step S9, the metadata generation unit 224 generates position/posture information.

Specifically, the metadata generation unit 224 generates position/posture information indicating the position and posture of the vehicle 11 estimated in the processing of Step S2.

In Step S10, the metadata generation unit 224 generates material information. For example, the metadata generation unit 224 estimates the material properties of each polygon of the right and left key frames (polygon meshes) on the basis of the material table stored in the material table storage unit 203. Note that in the case where the material properties of each polygon of the right and left polygon meshes are already estimated in the processing of Step S8, this estimation processing can be omitted. Then, the metadata generation unit 224 generates material information indicating the estimation results of the material properties of each polygon of the right and left key frames.

In Step S11, the metadata generation unit 224 adds a key frame. Specifically, the metadata generation unit 224 adds, to the key frame map stored in the map storage unit 204, the right and left key frames and metadata containing the position/posture information and the material information in association with each other.

Figure 5:
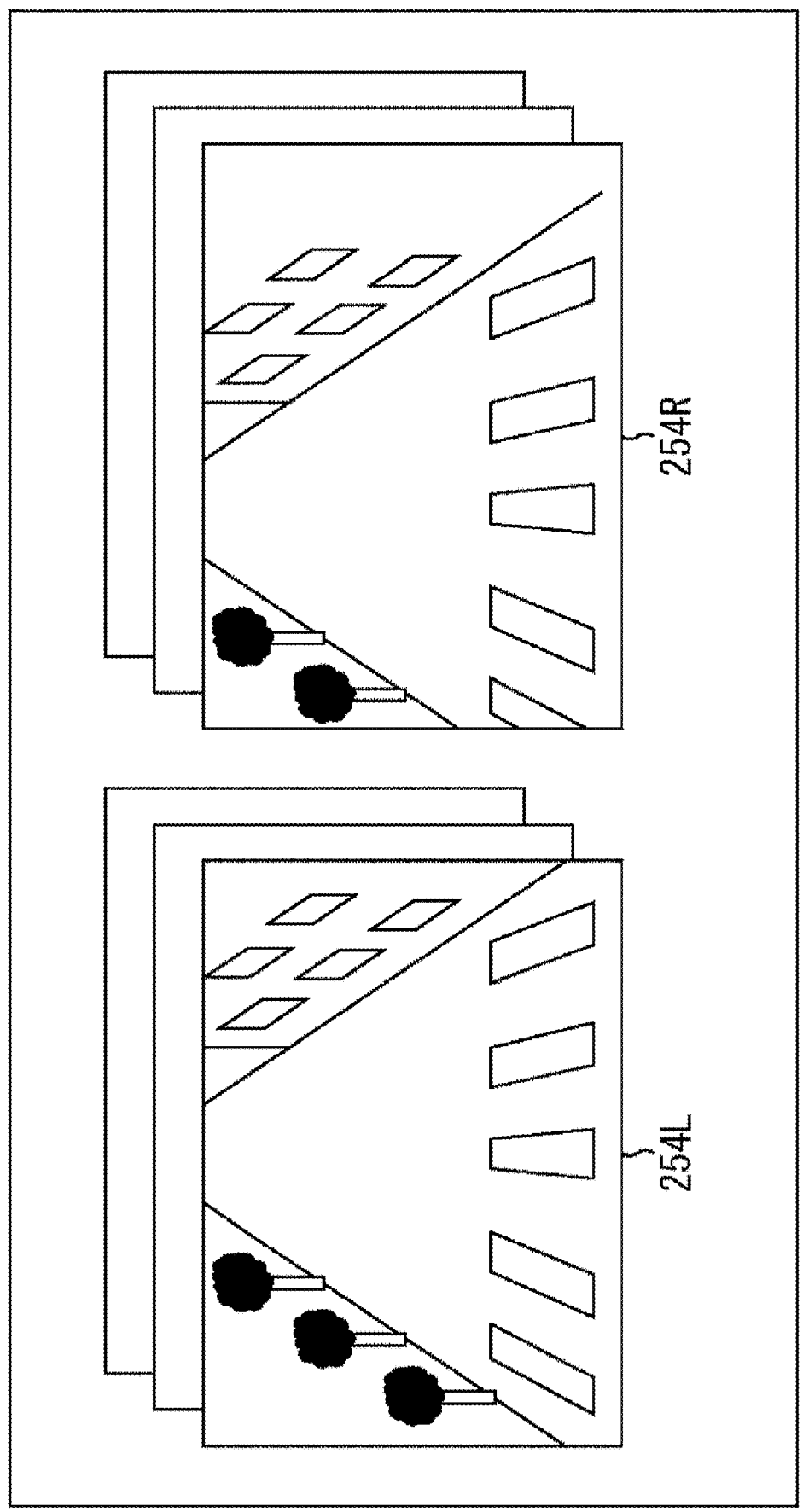
FIG. 5 is a schematic diagram showing an example of a key frame map.

For example, as shown in FIG. 5, a left key frame 254L generated from the left map image and a right key frame 254R generated from the right map image are added to the key frame map. Note that although the left key frame 254L and the right key frame 254R each actually include a polygon mesh, they are each shown by a normal image in order to make the figure easy to understand.

Note that a right and left pair of two key frames will be referred to as the key frame pair hereinafter. Therefore, a plurality of key frame pairs are registered in the key frame map.

After that, the processing returns to Step S1, and the processing of Step S1 and subsequent Steps is executed.

In this way, a key frame pair in which at least a part of the dynamic element of the right and left map images is invalidated is generated on the basis of right and left map images captured at different positions and postures while the vehicle 11 runs, and added to a key frame map. Further, metadata containing position/posture information and material information is added to each key frame pair.

Configuration of Map Generation System

Figure 6:
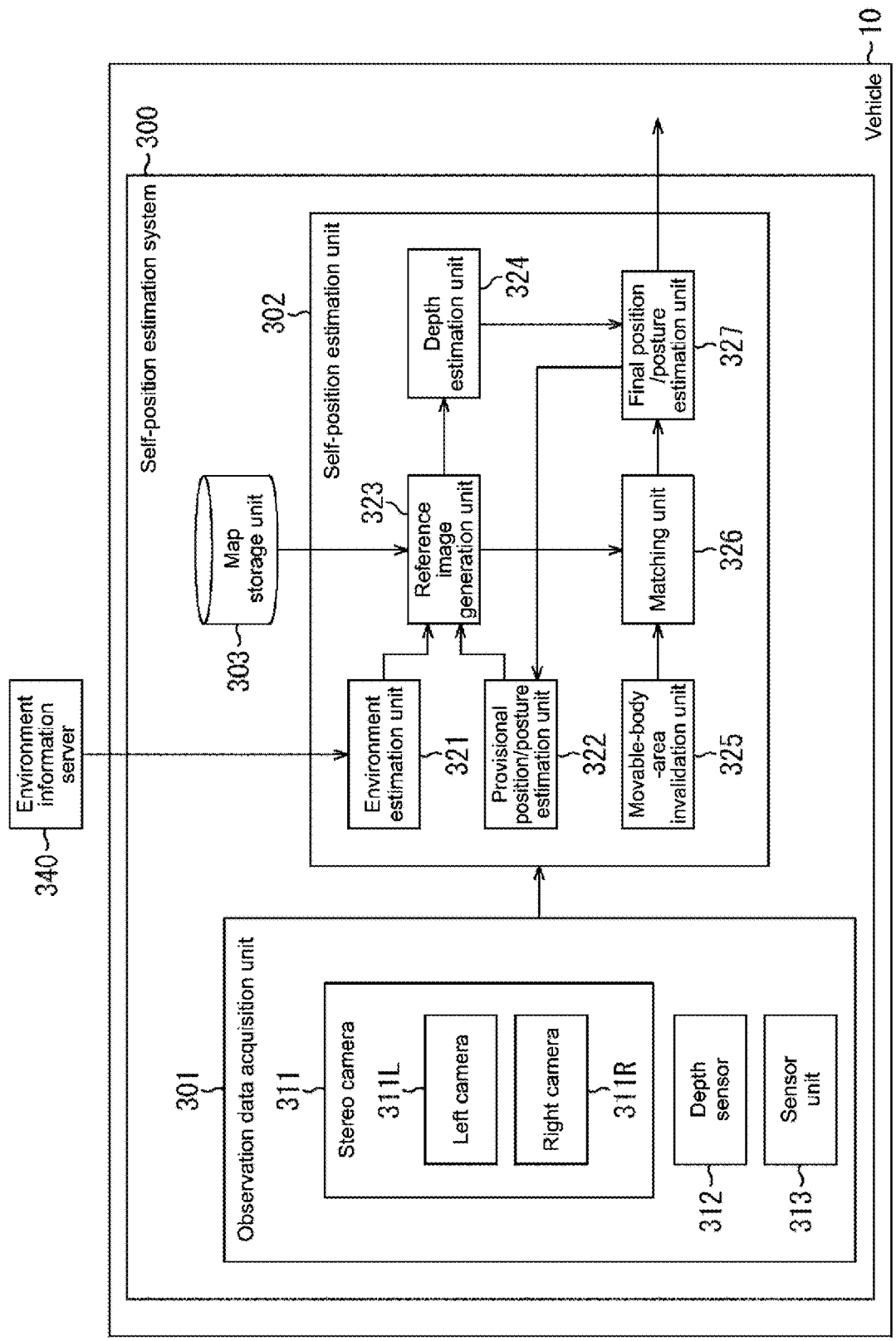
FIG. 6 is a block diagram showing an embodiment of a self-position estimation system to which the present technology is applied.

FIG. 6 is a block diagram showing an embodiment of a self-position estimation system to which the present technology is applied.

A self-position estimation system 300 is a system that performs processing corresponding to the processing performed by mainly the self-position estimation unit 132 of the vehicle control system 100 shown in FIG. 1. Specifically, the self-position estimation system 300 performs self-position estimation processing for estimating the position and posture of the vehicle 10 in which the self-position estimation system 300 is installed, by using the key frame map generated by the map generation system 200.

The self-position estimation system 300 includes an observation data acquisition unit 301, a self-position estimation unit 302, and a map storage unit 303.

The observation data acquisition unit 301 acquires data (hereinafter, referred to as the observation data) to be used for self-position estimation processing. The observation data acquisition unit 301 includes a stereo camera 311, a depth sensor 312, and a sensor unit 313.

The stereo camera 311 includes a left camera 311L and a right camera 311R. The left camera 311L and the right camera 311R capture images (stereo photographing) of the front of the vehicle 10 from different, i.e., left and right directions, respectively, and supply the resulting captured images (hereinafter, referred to as the observation images) to the self-position estimation unit 302.

Note that hereinafter, when individually distinguishing the observation image captured by the left camera 311L and the observation image captured by the right camera 311R with each other, the former is referred to as the left observation image and the latter is referred to as the right observation image.

The depth sensor 312 detects the distance (depth) to each object in front of the vehicle 10, and supplies depth information indicating the detection results to the self-position estimation unit 302.

The sensor unit 313 includes, for example, various sensors for detecting data to be used for estimating the position and posture of the vehicle 10 and the environment in the vicinity of the vehicle 10. For example, the sensor unit 313 includes, an IMU for detecting the acceleration, angular velocity, and the like of the vehicle 10, a GNSS receiver that receives a GNSS signal from a GNSS satellite, a luminometer, an air flow sensor, a wind direction sensor, a radar, a polarized camera, and the like. The sensor unit 313 supplies, to the self-position estimation unit 302, the sensor data output from each sensor.

The self-position estimation unit 302 performs self-position estimation processing for estimating the position and posture of the vehicle 10. The self-position estimation unit 302 includes an environment estimation unit 321, a provisional position/posture estimation unit 322, a reference image generation unit 323, a depth estimation unit 324, a movable-body-area invalidation unit 325, a matching unit 326, and a final position/posture estimation unit 327.

The environment estimation unit 321 estimates the environment in the vicinity of the vehicle 10 on the basis of the observation data and environment information supplied from an environment information server 340. The environment information contains, for example, information regarding weather in the vicinity of the vehicle 10. The environment estimation unit 321 supplies the estimation results of the environment in the vicinity of the vehicle 10 to the reference image generation unit 323.

The provisional position/posture estimation unit 322 estimates the provisional position and the provisional posture of the vehicle 10 on the basis of the observation data. The provisional position/posture estimation unit 322 supplies the estimation results of the provisional position and the provisional posture of the vehicle 10 to the reference image generation unit 323.

The reference image generation unit 323 extracts, from the key frame map stored in the map storage unit 303, a key frame pair (right and left key frames) generated at a position and posture close to the provisional position and the provisional posture of the vehicle 10. The reference image generation unit 323 processes the extracted right and left key frames on the basis of the environment in the vicinity of the vehicle 10 (environment in which the vehicle 10 moves), and thereby generates dynamic key frames that are right and left reference images. The reference image generation unit 323 supplies the generated right and left dynamic key frames to the depth estimation unit 324 and the matching unit 326.

The depth estimation unit 324 performs stereo matching between the right and left dynamic key frames, and thereby estimates the depth of each pixel of each the dynamic key frames. The depth estimation unit 324 supplies the estimation results of the depth of each pixel of the dynamic key frames to the final position/posture estimation unit 327.

The movable-body-area invalidation unit 325 invalidates a movable body area of the observation image similarly to the movable-body-area invalidation unit 231 of the map generation system 200 shown in FIG. 2. The movable-body-area invalidation unit 325 supplies the observation image in which the movable body area is invalidated to the matching unit 326.

The matching unit 326 performs matching processing on the observation image and the dynamic key frame. The matching unit 326 supplies the observation image, the dynamic key frame, and the results of the matching processing to the final position/posture estimation unit 327.

The final position/posture estimation unit 327 estimates the final position and posture of the vehicle 10 on the basis of the observation image, the dynamic key frame, the estimation results of the depth of each pixel of the dynamic key frame, and the results of the matching processing of the observation image and the dynamic key frame. The final position/posture estimation unit 327 outputs the final estimation results of the position and posture of the vehicle 10.

The map storage unit 303 stores the key frame map generated by the map generation system 200 shown in FIG. 2.

Note that the map storage unit 303 does not necessarily need to be provided in the vehicle 10, and may be provided in an external server or the like. In the case where the map storage unit 204 and the map storage unit 303 are provided in the external server, for example, the map storage unit 204 shown in FIG. 2 and the map storage unit 303 can be commonized.

Self-Position Estimation Processing

Figure 7:
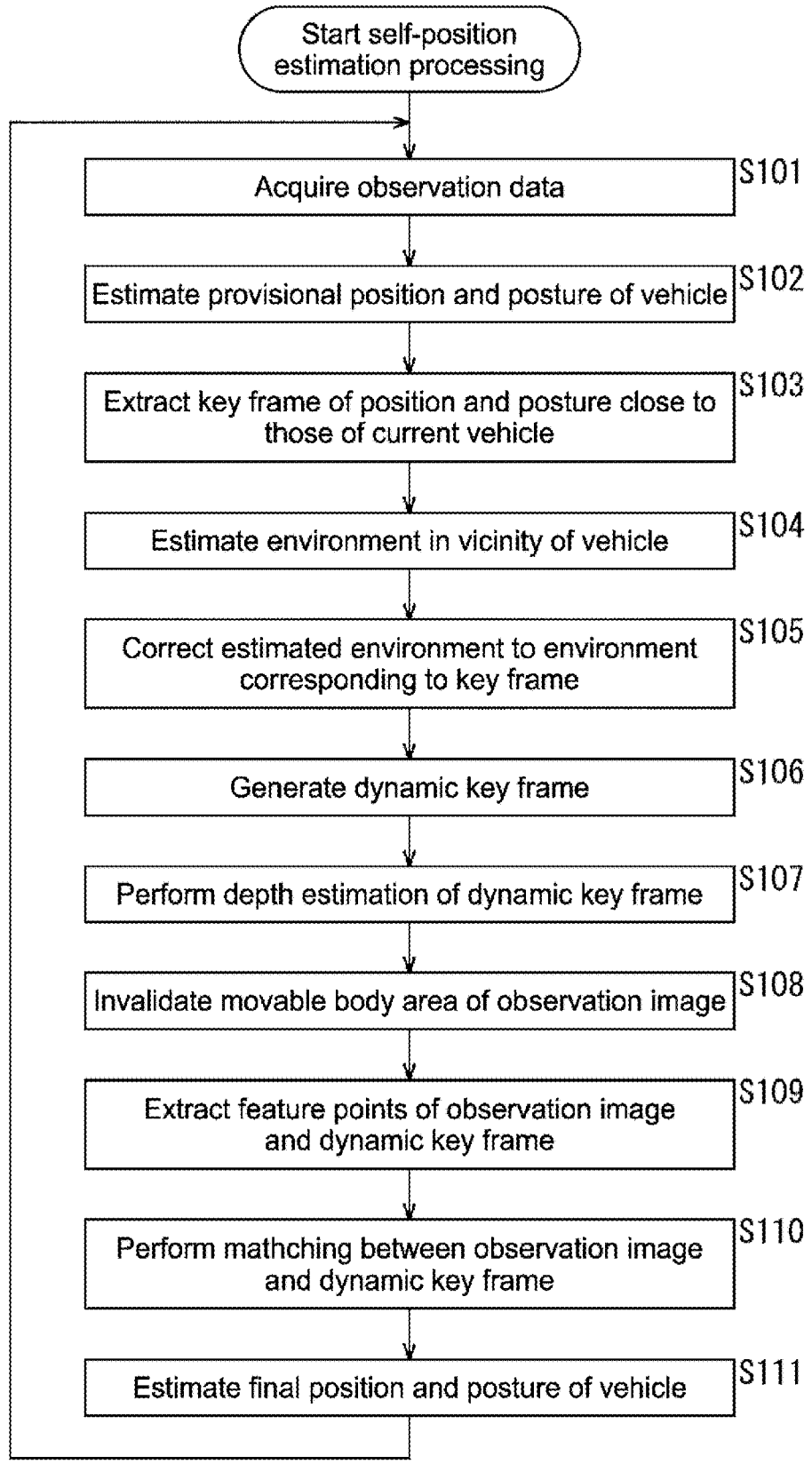
FIG. 7 is a flowchart describing self-position estimation processing.

Next, with reference to the flowchart of FIG. 7, self-position estimation processing to be performed by the self-position estimation system 300 will be described. Note that this processing is started when the vehicle 10 in which the self-position estimation system 300 is installed is activated and performs an operation of starting driving, e.g., an ignition switch, a power switch, a start switch, or the like of the vehicle 10 is turned on. Further, this processing is finished when an operation of finishing the driving is performed, e.g., the ignition switch, the power switch, the start switch, or the like of the vehicle 10 is turned off.

In Step S101, the observation data acquisition unit 301 acquires the observation data.

Specifically, the left camera 311L and the right camera 311R of the stereo camera 311 capture images of the front of the vehicle 10, and supply the resulting left observation image and right observation image to the self-position estimation unit 302.

The depth sensor 312 supplies detects the depth to each object in front of the vehicle 10, and supplies depth information indicating the detection results to the self-position estimation unit 302.

Each sensor of the sensor unit 313 performs processing of detecting various types of data, and supplies sensor data indicating the detection results to the self-position estimation unit 302.

In Step S102, the provisional position/posture estimation unit 322 estimates the provisional position and posture of the vehicle 10. Specifically, the provisional position/posture estimation unit 322 estimates the relative position and the relative posture of the current vehicle 10 with respect to the absolute position and the absolute posture of the latest vehicle 10 estimated in the previous processing of Step S111 (to be described later).

Note that as the method of estimating the relative position and the relative posture of the vehicle 10, an arbitrary method can be adopted. For example, a method such as a SLAM using the observation image and the depth information, an inertial navigation method using an IMU, and odometry using a vehicle speed pulse can be used. Further, estimation results obtained by a plurality of methods may be added by using a statistical filter such as a Kalman filter and a particle filter.

Then, the provisional position/posture estimation unit 322 estimates the provisional position and the provisional posture of the current vehicle 10 by adding the estimated relative position and relative posture to the absolute position and the absolute posture of the latest vehicle 10. The provisional position/posture estimation unit 322 supplies the estimation results of the provisional position and the provisional posture to the reference image generation unit 323.

Note that since processing of Step S111 is not performed yet in the first processing of Step S102, the absolute position and the absolute posture of the vehicle 10 are estimated in advance by, for example, another method.

In Step S103, the reference image generation unit 323 extracts a key frame of the position and posture close to those of the current vehicle 10. Specifically, the reference image generation unit 323 compares the position/posture information added to each key frame pair of the key frame map stored in the map storage unit 303 and the estimated provisional position and provisional posture of the vehicle 10. Then, the reference image generation unit 323 extracts a key frame pair to which position/posture information that a difference between the provisional position and the provisional posture is within a predetermined range is added.

Note that at this time, although a plurality of key frame pairs are extracted in some cases, a case where one key frame pair is extracted will be described below in order to make the description easy.

In Step S104, the environment estimation unit 321 estimates the environment in the vicinity of the vehicle 10. For example, the environment estimation unit 321 estimates the position and illumination of a light source, weather, a wind direction, a wind speed, and the like in the vicinity of the vehicle 10 on the basis of the observation data. The environment estimation unit 321 supplied the estimation results to the reference image generation unit 323.

Note that as the method of estimating the environment, an arbitrary method can be adopted. Further, for example, environment information supplied from the environment information server 340 can also be used for estimating the environment in the vicinity of the vehicle 10.

In Step S105, the reference image generation unit 323 corrects the estimated environment to the environment corresponding to the key frame. Specifically, the environment estimated by the environment estimation unit 321 is the environment at the position and posture of the current vehicle 10, and different from the environment at the position and posture corresponding to each key frame pair extracted by the processing of Step S103 in some cases. Then, the reference image generation unit 323 corrects the environment estimated by the environment estimation unit 321 to the environment at the position and posture corresponding to each key frame pair on the basis of the difference between the provisional position and the provisional posture and the position and posture corresponding to each extracted key frame pair. Accordingly, the position of the light source, the wind direction, and the like are corrected.

In Step S106, the reference image generation unit 323 generates a dynamic key frame. Specifically, the reference image generation unit 323 processes the right and left key frames included in the extracted key frame pair on the basis of the corrected environment (e.g., weather, a light source, and wind) and the material information of the key frame, and thereby generates right and left dynamic key frames.

Figure 8:
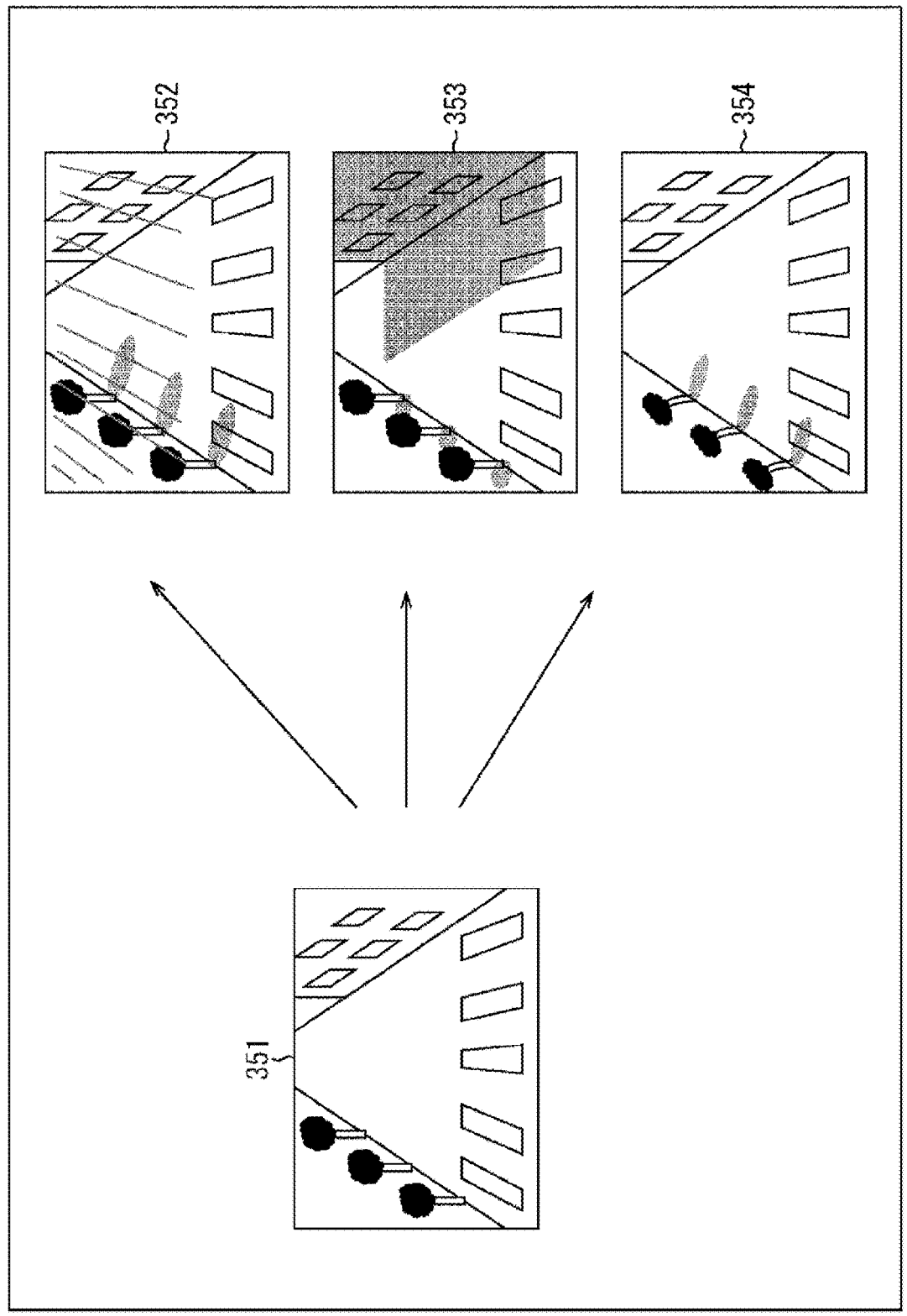
FIG. 8 is a schematic diagram showing an example of a dynamic key frame.
Figure 10:
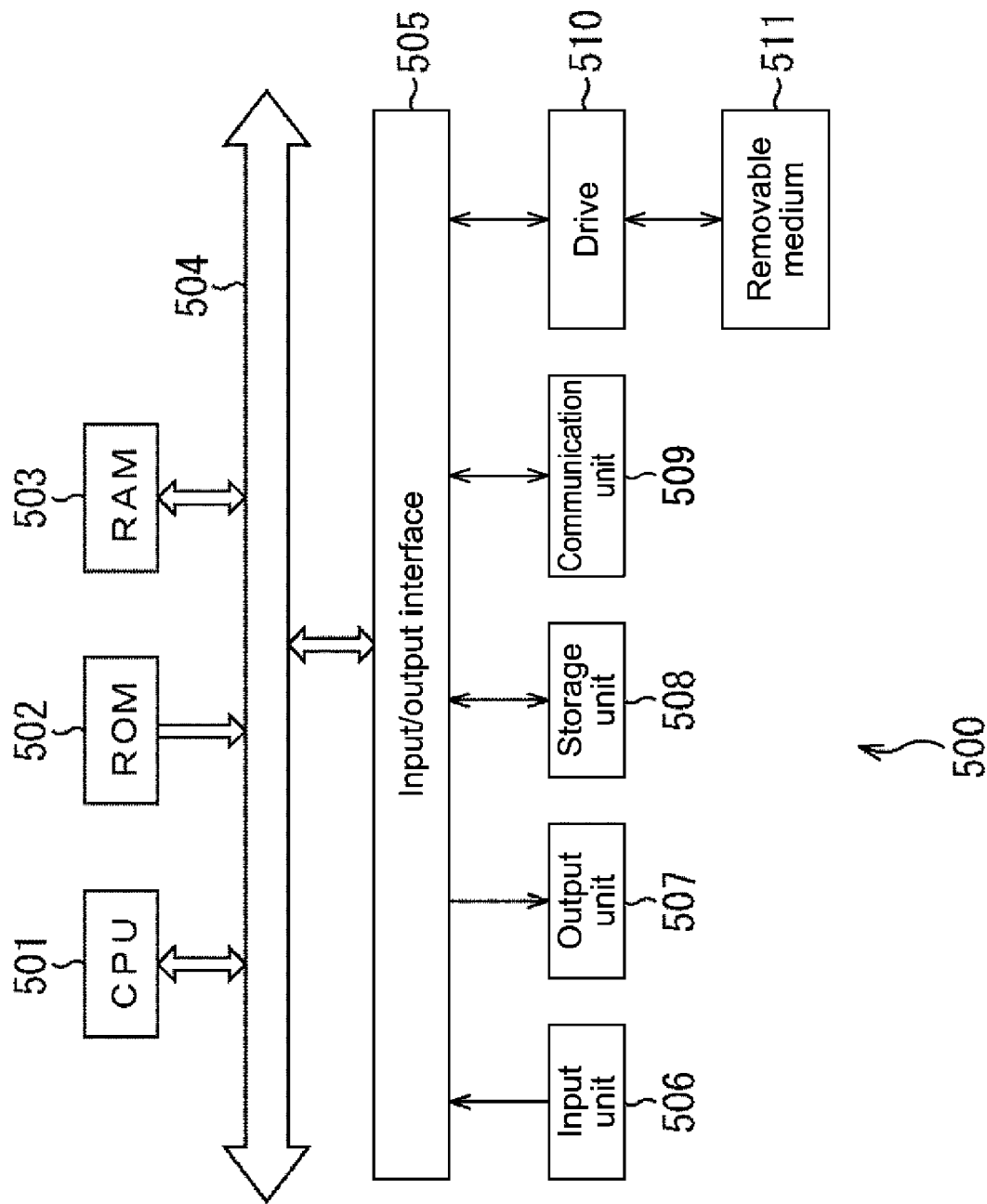
FIG. 10 is a diagram showing a configuration example of a computer.

For example, as shown in FIG. 8, a dynamic key frame 352 is generated by adding an effect based on the estimated light source and weather to a key frame 351. In the dynamic key frame 352, shadows of trees and falling rain are added as compared with the key frame 351.

Further, for example, a dynamic key frame 353 is generated by adding an effect based on the estimated light source to the key frame 351. In the dynamic key frame 353, a shadow of a building and shadows of trees are added as compared with the key frame 351.

Further, for example, a dynamic key frame 354 is generated by adding an effect based on the estimated light source, wind direction, and air flow to the key frame 351. In the dynamic key frame 354, shadows of trees and the state of the trees blowing in the wind are added as compared with the key frame 351.

Note that although the key frame 351 and the dynamic key frame 352 to the dynamic key frame 354 shown in FIG. 8 each actually include a polygon mesh, they are each shown by a normal image in order to make the figure easy to understand.

The reference image generation unit 323 supplies the generated right and left dynamic key frames to the depth estimation unit 324 and the matching unit 326.

In Step S107, the depth estimation unit 324 performs depth estimation of the dynamic key frame. Specifically, the depth estimation unit 324 performs stereo matching between the right and left dynamic key frames to estimate the depth of each pixel. The depth estimation unit 324 supplies the estimation results of the depth of each pixel of the right and left dynamic key frames to the final position/posture estimation unit 327.

In Step S108, the movable-body-area invalidation unit 325 invalidates a movable body area of the observation image. Specifically, the movable-body-area invalidation unit 325 invalidates a movable body area of the observation image similarly to the processing of Step S4 shown in FIG. 7. The movable-body-area invalidation unit 325 supplies the observation image from which the movable body area has been removed to the matching unit 326.

At this time, only one of the right and left observation images may be used for self-position estimation processing, and the movable body area of only the one observation image may be invalidated. Note that a case where only the left observation image is used for self-position estimation processing will be described below as an example.

In Step S109, the matching unit 326 extracts feature points of the observation image and the dynamic key frame. For example, the matching unit 326 extracts a feature point of the left observation image in which the movable body area is invalidated and a feature point of the left dynamic key frame, and calculates a feature amount of each of the extracted feature points.

Note that as the feature point and the feature amount, any type of feature point and any type of feature amount can be used. For example, as the feature point, Harris Corner or the like can be used. As the feature amount, for example, a template image mainly including a feature point, AKAZE, ORB, or the like can be used.

In Step S110, the matching unit 326 performs matching between the observation image and the dynamic key frame. Specifically, the matching unit 326 performs matching between feature points of the left observation image and the left dynamic key frame on the basis of the extracted feature point and feature amount. The matching unit 326 supplies the left observation image, the left dynamic key frame, and the results of the feature point matching processing to the final position/posture estimation unit 327.

In Step S111, the final position/posture estimation unit 327 estimates the final position and posture of the vehicle 10. Specifically, the final position/posture estimation unit 327 estimates the relative position and posture of the left camera 311L with an origin of the left dynamic key frame as a reference, on the basis of three-dimensional coordinates in the left dynamic key frame and two-dimensional coordinates in the left observation image, of the feature points associated with each other by the feature point matching. Note that coordinates in a z-axis direction (depth direction) of each feature point of the left dynamic key frame is based on the results of the depth estimation in Step S107.

Note that as the method of estimating the position and posture, an arbitrary method such as P3P and RANSAC (Random Sample Consensus) can be adopted.

Next, the final position/posture estimation unit 327 converts, on the basis of the position/posture information of the left key frame used for generating the left dynamic key frame, the estimated relative position and posture of the left camera 311L into the absolute position and posture.

Then, the final position/posture estimation unit 327 converts the absolute position and posture of the left camera 311L into the absolute position and posture of the vehicle 10 on the basis of offsets of a position and posture between the left camera 311L and a predetermined position of the vehicle 10 (e.g., center of a rear wheel axle).

Note that for the offsets of the position and posture between the left camera 311L and the vehicle 10, for example, a value obtained by calibration performed in advance, a design value, or the like is used.

The final position/posture estimation unit 327 outputs self-position estimation information indicating the estimated absolute position and posture of the vehicle 10. This self-position estimation information is supplied to, for example, the map analysis unit 151, the traffic rule recognition unit 152, or the like shown in FIG. 1, and used for controlling self-driving such as autonomous driving and driving assistance.

After that, the processing returns to Step S101, and the processing of Step S101 and subsequent Steps is executed.

In this way, it is possible to improve the accuracy of estimating the position and posture of a vehicle.

For example, FIG. 9 schematically shows an example of an image captured at the same position and posture and a different time of day. An image 361 is an image similar to the map image 251 shown in FIG. 4. An image 362 is an image similar to the dynamic key frame 353 shown in FIG. 8 (where it is not a polygon mesh).

For example, in the case where the image 361 is a key frame and the image 362 is an observation image, there are many differences between them, which reduces the matching accuracy. As a result, the accuracy of estimating the position and posture of the vehicle is reduced.

Meanwhile, according to the present technology, for example, the key frame 253 shown in FIG. 4, in which the dynamic element such as a movable body and a shadow in the image 361 is invalidated, is generated, and the dynamic key frame 353 shown in FIG. 8 is generated on the basis of the key frame 253. Then, matching between the dynamic key frame 353 and the observation image 362 is performed, so that the matching accuracy is improved. As a result, the accuracy of estimating the position and posture of the vehicle is improved.

Further, according to the present technology, there is no need to generate a plurality of key frames depending on the environment (e.g., weather and time of day) for a similar position and posture, and register the key frames. Therefore, it is possible to suppress the increase in capacity of the key frame map.

3. Modified Examples

Hereinafter, modified example of the above-mentioned embodiments of the technology according to the present disclosure will be described.

In the above description, the example in which a movable body area and a shadow are invalidated as dynamic elements of the map image has been shown. However, the dynamic element to be invalidated can be arbitrarily changed. For example, the dynamic element regarding weather such as rain and snow in the map image may be invalidated.

Further, in the above description, the example in which material properties are estimated for each polygon of a key frame to generate material information has been shown. However, for example, the material properties may be estimated for each object in the key frame on the basis of the results of semantic segmentation to generate material information.

Further, for example, in the map generation system 200, depth information may be estimated without using the depth sensor 212, by performing stereo matching between right and left map images captured by the stereo camera 211. Similarly, in the self-position estimation system 300, depth information may be estimated without using the depth sensor 312, by performing stereo matching between right and left observation images captured by the stereo camera 311.

Further, in the above description, the example in which a vehicle that generates a key frame map is different from a vehicle that performs self-position estimation has been shown. However, for example, also the map generation system 200 may be installed in the vehicle 10 to generate a key frame map.

Further, for example, a plurality of vehicles may be used for generating a key frame map of each area, and the key frame maps may be integrated later.

Further, the present technology is applicable to a case of performing self-position estimation processing on not only the vehicle illustrated above but also various movable objects such as a motorcycle, a bicycle, a personal mobility, an airplane, a ship, a construction machine, and an agricultural machine (tractor). Further, the movable object to which the present technology is applicable includes a movable object that a user does not board, which is driven (operated) remotely, such as a drone and a robot.

4. Others

Configuration Example of Computer

The series of processes described above can be performed by hardware or software. In the case where the series of processes are performed by the software, programs that constitute the software are installed in a computer. Examples of the computer include a computer incorporated in dedicated hardware, a general-purpose personal computer capable of executing various functions by installing various programs, and the like.

FIG. 15 is a block diagram showing a configuration example of the hardware of a computer that executes the series of processes described above by programs.

In a computer 500, a CPU (Central Processing Unit) 501, a ROM (Read Only Memory) 502, and a RAM (Random Access Memory) 503 are connected to each other via a bus 504.

To the bus 504, an input/output interface 505 is further connected. To the input/output interface 505, an input unit 506, an output unit 507, a storage unit 508, a communication unit 509, and a drive 510 are connected.

The input unit 506 includes an input switch, a button, a microphone, an image sensor, or the like. The output unit 507 includes a display, a speaker, or the like. The storage unit 508 includes a hard disk, a non-volatile memory, or the like. The communication unit 509 includes a network interface or the like. The drive 510 drives a removable medium 511 such as a magnetic disk, an optical disk, a magneto-optical disk, and a semiconductor memory.

In the computer 500 having the configuration as described above, for example, the CPU 501 loads a program stored in the storage unit 508 to the RAM 503 via the input/output interface 505 and the bus 504 and executes the program, thereby executing the series of processes described above.

The program executed by the computer 500 (CPU 501) can be provided by being recorded in the removable medium 511 as a package medium or the like, for example. Further, the program can be provided via a wired or wireless transmission medium, such as a local area network, the Internet, and a digital satellite broadcast.

In the computer 500, the program can be installed in the storage unit 508 via the input/output interface 505 by loading the removable medium 511 to the drive 510. Further, the program can be received by the communication unit 509 via a wired or wireless transmission medium and installed in the storage unit 508. In addition, the program can be installed in advance in the ROM 502 or the storage unit 508.

It should be noted that the program executed by the computer may be a program, the processes of which are performed in a chronological order along the description order in the specification, or may be a program, the processes of which are performed in parallel or at necessary timings when being called, for example.

Further, in the specification, the system refers to a set of a plurality of components (apparatuses, modules (parts), and the like). Whether all the components are in the same casing or not is not considered. Therefore, both of a plurality of apparatuses stored in separate casings and connected via a network and one apparatus having a plurality of modules stored in one casing are systems.

Further, the embodiments of present technology are not limited to the above-mentioned embodiments and can be variously modified without departing from the essence of the present technology.

For example, the present technology can have the configuration of cloud computing in which one function is shared by a plurality of apparatuses via a network and processed in cooperation with each other.

Further, the steps described in the flowchart described above can be executed by one apparatus or by a plurality of apparatuses in a sharing manner.

Further, in the case where one step includes a plurality of processes, the plurality of processes in the one step can be performed by one apparatus or shared by a plurality of apparatus.

Combination Examples of Configurations

It should be noted that the present technology can take the following configurations.

(1)
A computerized method for estimating a position of a movable object, the method comprising:
generating a dynamic reference image based on an environment and a reference image extracted from a map; and
estimating a position of the movable object based on the dynamic reference image and an observation image of an area around the movable object.

(2)
The method according to (1), further comprising:
acquiring the observation image;
extracting the reference image from the map based on a provisional position of the movable object; and
estimating the environment based on received sensor data around the movable object.

(3)
The method according to (2), wherein estimating the environment comprises estimating one or more of a light source, weather, a wind direction, a wind speed, or some combination thereof, around the movable object.

(4)
The method according to (2), wherein:
acquiring the observation image of the area around the movable object comprises acquiring a stereo pair of images, comprising a left observation image and a right observation image;
extracting the reference image from the map comprises extracting a reference image pair comprising a left reference image and a right reference image from the map;
generating the dynamic reference image comprises:
generating a left dynamic reference image based on the estimated environment and the left reference image; and
generating a right dynamic reference image based on the estimated environment and the right reference image; and
estimating the position of the movable object comprises estimating the position based on the left or right dynamic reference images and the left or right observation images.

(5)
The method according to (1), further comprising:
generating a corrected estimated environment to correct the estimated environment to an associated environment of the reference image; and
generating the dynamic reference image comprises adjusting the reference image based on the corrected estimated environment.

(6)
The method according to (1),
further comprising estimating a provisional position of the movable object, wherein the provisional position comprises the provisional position of the movable object and a provisional posture of the movable object; and
wherein estimating the position of the movable object comprises estimating an updated position of the movable object and an updated posture of the movable object.

(7)
An apparatus for estimating a position of a movable object, the apparatus comprising a processor in communication with a memory, the processor being configured to execute instructions stored in the memory that cause the processor to:
generate a dynamic reference image based on an estimated environment and a reference image extracted from a map; and
estimate a position of the movable object based on the dynamic reference image and an observation image of an area around the movable object.

(8)
The apparatus according to (7), wherein the instructions are further operable to cause the processor to:
acquire the observation image of the area around the movable object;
extract the reference image from the map based on a provisional position of the movable object; and
estimate the environment based on received sensor data around the movable object.

(9)
The apparatus according to (8), wherein estimating the environment comprises estimating one or more of a light source, weather, a wind direction, a wind speed, or some combination thereof, around the movable object.

(10)

The apparatus according to (8), wherein:

acquiring the observation image of the area around the movable object comprises acquiring a stereo pair of images, comprising a left observation image and a right observation image;

extracting the reference image from the map comprises extracting a reference image pair comprising a left reference image and a right reference image from the map;

generating the dynamic reference image comprises:

generating a left dynamic reference image based on the estimated environment and the left reference image; and generating a right dynamic reference image based on the estimated environment and the right reference image; and estimating the position of the movable object comprises estimating the position based on the left or right dynamic reference images and the left or right observation images.

(11)

The apparatus according to (7), wherein the instructions are further operable to cause the processor to:

generate a corrected estimated environment to correct the estimated environment to an associated environment of the reference image; and generate the dynamic reference image comprises adjusting the reference image based on the corrected estimated environment.

(12)

The apparatus according to (7), wherein the instructions are further operable to cause the processor to estimate a provisional position of the movable object, wherein the provisional position comprises the provisional position of the movable object and a provisional posture of the movable object; and wherein estimating the position of the movable object comprises estimating an updated position of the movable object and an updated posture of the movable object.

(13)

A non-transitory computer-readable storage medium comprising computer-executable instructions that, when executed by a processor, perform a method for estimating a position of a movable object, the method comprising:

generating a dynamic reference image based on an estimated environment and a reference image extracted from a map; and estimating a position of the movable object based on the dynamic reference image and an observation image of an area around the movable object.

(14)

The non-transitory computer-readable storage medium according to (13), the method further comprising:

acquiring the observation image of the area around the movable object;

extracting the reference image from the map based on a provisional position of the movable object;

estimating the environment based on received sensor data around the movable object.

(15)

The non-transitory computer-readable storage medium according to (14), wherein estimating the environment comprises estimating one or more of a light source, weather, a wind direction, a wind speed, or some combination thereof, around the movable object.

(16)

The non-transitory computer-readable storage medium according to (14), wherein:

acquiring the observation image of the area around the movable object comprises acquiring a stereo pair of images, comprising a left observation image and a right observation image;

extracting the reference image from the map comprises extracting a reference image pair comprising a left reference image and a right reference image from the map;

generating the dynamic reference image comprises:

generating a left dynamic reference image based on the estimated environment and the left reference image; and generating a right dynamic reference image based on the estimated environment and the right reference image; and estimating the position of the movable object comprises estimating the position based on the left or right dynamic reference images and the left or right observation images.

(17)

The non-transitory computer-readable storage medium according to (13), the method further comprising:

generating a corrected estimated environment to correct the estimated environment to an associated environment of the reference image; and generating the dynamic reference image comprises adjusting the reference image based on the corrected estimated environment.

(18)

The non-transitory computer-readable storage medium according to (13), the method further comprising estimating a provisional position of the movable object, wherein the provisional position comprises the provisional position of the movable object and a provisional posture of the movable object; and wherein estimating the position of the movable object comprises estimating an updated position of the movable object and an updated posture of the movable object.

(19)

A movable object configured to estimate a position of the movable object, the movable object comprising one or more processors in communication with a memory, the one or more processors being configured to execute instructions stored in the memory that cause the one or more processors to:

generate a dynamic reference image based on an estimated environment and a reference image extracted from a map;

estimate a position of the movable object based on the dynamic reference image and an observation image of an area around the movable object; and generate a control signal to control movement of the movable object based on the estimated position.

(20)

The movable object according to (19), further comprising a driving-system control unit configured to:

generate the control signal; and provide the control signal to a driving system to control movement of the movable object based on the estimated position.

(21)

The movable object according to (19), wherein the instructions are further operable to cause the processor to:

acquire the observation image of the area around the movable object;

extract the reference image from the map based on a provisional position of the movable object;

estimate the environment based on received sensor data around the movable object.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10, 11 vehicle
100 vehicle control system
112 self-driving control unit
132 self-position estimation unit
200 map generation system
202 map generation unit
211 stereo camera
212 depth sensor
213 sensor unit
223 registration image generation unit
224 metadata generation unit
231 movable-body-area invalidation unit
232 CG processing unit
233 shadow removal unit
300 self-position estimation system
302 self-position estimation unit
311 stereo camera
312 depth sensor
313 sensor unit
321 environment estimation unit
322 provisional position/posture estimation unit
323 reference image generation unit
324 depth estimation unit
325 movable-body-area invalidation unit
326 matching unit
327 final position/posture estimation unit

The invention claimed is:

1. A computerized method for estimating a position of a movable object, the method comprising:
generating a dynamic reference image by adding an effect to a reference image corresponding to a location, wherein adding the effect comprises adding the effect based on an environment and a material property associated with the reference image; and
estimating a position of the movable object based on the dynamic reference image and an observation image of an area around the movable object.

2. The method of claim 1, further comprising:
acquiring the observation image;
extracting the reference image from a map based on a provisional position of the movable object; and
estimating the environment based on received sensor data around the movable object.

3. The method of claim 2, wherein estimating the environment comprises estimating one or more of a light source, weather, a wind direction, a wind speed, or some combination thereof, around the movable object.

4. The method of claim 2, wherein:
acquiring the observation image of the area around the movable object comprises acquiring a stereo pair of images, comprising a left observation image and a right observation image;
extracting the reference image from the map comprises extracting a reference image pair comprising a left reference image and a right reference image from the map;
generating the dynamic reference image comprises:
generating a left dynamic reference image based on the estimated environment and the left reference image;
generating a right dynamic reference image based on the estimated environment and the right reference image; and
estimating the position of the movable object comprises estimating the position based on the left or right dynamic reference images and the left or right observation images.

5. The method of claim 2, further comprising:
generating a corrected estimated environment to correct the estimated environment to an associated environment of the reference image; and
generating the dynamic reference image comprises adjusting the reference image based on the corrected estimated environment.

6. The method of claim 1, further comprising estimating a provisional position of the movable object, wherein the provisional position comprises the provisional position of the movable object and a provisional posture of the movable object; and
wherein estimating the position of the movable object comprises estimating an updated position of the movable object and an updated posture of the movable object.

7. An apparatus for estimating a position of a movable object, the apparatus comprising a processor in communication with a memory, the processor being configured to execute instructions stored in the memory that cause the processor to:
generate a dynamic reference image by adding an effect to a reference image corresponding to a location, wherein adding the effect comprises adding the effect based on an environment and a material property associated with the reference image; and
estimate a position of the movable object based on the dynamic reference image and an observation image of an area around the movable object.

8. The apparatus of claim 7, wherein the instructions are further operable to cause the processor to:
acquire the observation image of the area around the movable object;
extract the reference image from a map based on a provisional position of the movable object; and
estimate the environment based on received sensor data around the movable object.

9. The apparatus of claim 8, wherein estimating the environment comprises estimating one or more of a light source, weather, a wind direction, a wind speed, or some combination thereof, around the movable object.

10. The apparatus of claim 8, wherein:
acquiring the observation image of the area around the movable object comprises acquiring a stereo pair of images, comprising a left observation image and a right observation image;
extracting the reference image from the map comprises extracting a reference image pair comprising a left reference image and a right reference image from the map;
generating the dynamic reference image comprises:
generating a left dynamic reference image based on the estimated environment and the left reference image;
generating a right dynamic reference image based on the estimated environment and the right reference image; and
estimating the position of the movable object comprises estimating the position based on the left or right dynamic reference images and the left or right observation images.

11. The apparatus of claim 8, wherein the instructions are further operable to cause the processor to:
generate a corrected estimated environment to correct the estimated environment to an associated environment of the reference image; and
generate the dynamic reference image comprises adjusting the reference image based on the corrected estimated environment.

12. The apparatus of claim 7, wherein the instructions are further operable to cause the processor to estimate a provisional position of the movable object, wherein the provisional position comprises the provisional position of the movable object and a provisional posture of the movable object; and
wherein estimating the position of the movable object comprises estimating an updated position of the movable object and an updated posture of the movable object.

13. A non-transitory computer-readable storage medium comprising computer-executable instructions that, when executed by a processor, perform a method for estimating a position of a movable object, the method comprising:
generating a dynamic reference image by adding an effect to a reference image corresponding to a location, wherein adding the effect comprises adding the effect based on an environment and a material property associated with the reference image; and
estimating a position of the movable object based on the dynamic reference image and an observation image of an area around the movable object.

14. The non-transitory computer-readable storage medium of claim 13, the method further comprising:
acquiring the observation image of the area around the movable object;
extracting the reference image from a map based on a provisional position of the movable object; and
estimating the environment based on received sensor data around the movable object.

15. The non-transitory computer-readable storage medium of claim 14, wherein estimating the environment comprises estimating one or more of a light source, weather, a wind direction, a wind speed, or some combination thereof, around the movable object.

16. The non-transitory computer-readable storage medium of claim 14, wherein:
acquiring the observation image of the area around the movable object comprises acquiring a stereo pair of images, comprising a left observation image and a right observation image;
extracting the reference image from the map comprises extracting a reference image pair comprising a left reference image and a right reference image from the map;
generating the dynamic reference image comprises:
generating a left dynamic reference image based on the estimated environment and the left reference image;
generating a right dynamic reference image based on the estimated environment and the right reference image; and
estimating the position of the movable object comprises estimating the position based on the left or right dynamic reference images and the left or right observation images.

17. The non-transitory computer-readable storage medium of claim 14, the method further comprising:
generating a corrected estimated environment to correct the estimated environment to an associated environment of the reference image; and
generating the dynamic reference image comprises adjusting the reference image based on the corrected estimated environment.

18. The non-transitory computer-readable storage medium of claim 13, the method further comprising estimating a provisional position of the movable object, wherein the provisional position comprises the provisional position of the movable object and a provisional posture of the movable object; and
wherein estimating the position of the movable object comprises estimating an updated position of the movable object and an updated posture of the movable object.

19. A movable object configured to estimate a position of the movable object, the movable object comprising one or more processors in communication with a memory, the one or more processors being configured to execute instructions stored in the memory that cause the one or more processors to:
generate a dynamic reference image by adding an effect to a reference image corresponding to a location, wherein adding the effect comprises adding the effect based on an environment and a material property associated with the reference image;
estimate a position of the movable object based on the dynamic reference image and an observation image of an area around the movable object; and
generate a control signal to control movement of the movable object based on the estimated position.

20. The movable object of claim 19, further comprising a driving-system control unit configured to:
generate the control signal; and
provide the control signal to a driving system to control movement of the movable object based on the estimated position.

21. The movable object of claim 19, wherein the instructions are further operable to cause the processor to:
acquire the observation image of the area around the movable object;
extract the reference image from a map based on a provisional position of the movable object; and
estimate the environment based on received sensor data around the movable object.

* * * * *